United States Patent
Sone et al.

(10) Patent No.: US 11,603,442 B2
(45) Date of Patent: Mar. 14, 2023

(54) FIBER-REINFORCED THERMOPLASTIC RESIN SHEET, MOLDED BODY OF FIBER-REINFORCED THERMOPLASTIC RESIN SHEET, AND MANUFACTURING METHOD OF FIBER-REINFORCED THERMOPLASTIC RESIN SHEET

(71) Applicants: SUNCORONA ODA CO., LTD., Ishikawa (JP); KANAZAWA INSTITUTE OF TECHNOLOGY, Ishikawa (JP)

(72) Inventors: Keisuke Sone, Kanazawa (JP); Masaki Kobayashi, Komatsu (JP); Hirofumi Nishida, Nonoichi (JP); Kiyoshi Uzawa, Nonoichi (JP); Hisai Ueda, Nonoichi (JP)

(73) Assignees: SUNCORONA ODA CO., LTD., Ishikawa (JP); KANAZAWA INSTITUTE OF TECHNOLOGY, Ishikawa (JP)

( * ) Notice: Subject to any disclaimer, the term of this patent is extended or adjusted under 35 U.S.C. 154(b) by 68 days.

(21) Appl. No.: 16/616,907

(22) PCT Filed: Jun. 28, 2019

(86) PCT No.: PCT/JP2019/025974
§ 371 (c)(1),
(2) Date: Nov. 25, 2019

(87) PCT Pub. No.: WO2020/115937
PCT Pub. Date: Jun. 11, 2020

(65) Prior Publication Data
US 2021/0171728 A1    Jun. 10, 2021

(30) Foreign Application Priority Data

Dec. 4, 2018  (JP) .............................. JP2018-227566

(51) Int. Cl.
*C08J 5/24*     (2006.01)
*C08K 3/04*    (2006.01)
*C08K 7/06*    (2006.01)

(52) U.S. Cl.
CPC .................. *C08J 5/243* (2021.05); *C08K 3/04* (2013.01); *C08K 7/06* (2013.01); *C08J 2363/00* (2013.01)

(58) Field of Classification Search
CPC .......... C08J 5/24; C08J 2363/00; C08J 5/243; C08J 2363/02; C08J 5/042; C08K 7/06; C08K 3/04; C08L 71/02
See application file for complete search history.

(56) References Cited

U.S. PATENT DOCUMENTS

| | | | |
|---|---|---|---|
| 2007/0010611 A1 | 1/2007 | Hirayama et al. | |
| 2012/0135227 A1* | 5/2012 | Kawabe | D01D 11/02 428/338 |
| 2014/0342144 A1* | 11/2014 | Nakayama | C08J 5/06 428/220 |
| 2016/0326323 A1 | 11/2016 | Hayashi et al. | |
| 2017/0232702 A1 | 8/2017 | Hayashi et al. | |
| 2017/0369700 A1 | 12/2017 | Mitobe et al. | |
| 2018/0094176 A1* | 4/2018 | Okamoto | C09J 151/04 |

(Continued)

FOREIGN PATENT DOCUMENTS

| | | |
|---|---|---|
| EP | 3689967 | 8/2020 |
| JP | H08-225666 | 9/1996 |
| JP | H09-235397 | 9/1997 |

(Continued)

OTHER PUBLICATIONS

Machine Translation of JP 2006/233188 A (Year: 2006).*
International Search Report for International (PCT) Patent Application No. PCT/JP2019/025974, dated Oct. 1, 2019, 8 pages.
English Translation of the International Preliminary Report on Patentability for International (PCT) Patent Application No. PCT/JP2019/025974, dated Jun. 17, 2021, 6 pages.

(Continued)

*Primary Examiner* — Callie E Shosho
*Assistant Examiner* — Bethany M Miller
(74) *Attorney, Agent, or Firm* — Sheridan Ross P.C.

(57) ABSTRACT

An object of the present invention is to provide a fiber-reinforced thermoplastic resin sheet which can be manufactured into a molded body exhibiting excellent appearance quality as well as exhibits both high moldability and strength and a manufacturing method of such a fiber-reinforced thermoplastic resin sheet. The present invention relates to a fiber-reinforced thermoplastic resin sheet which is a random laminated body of a tape-shaped unidirectional prepreg and contains spread reinforcement fibers and a polymer (a) and in which the polymer (a) is a polymer of at least a bisphenol A type epoxy compound represented by Formula (1):

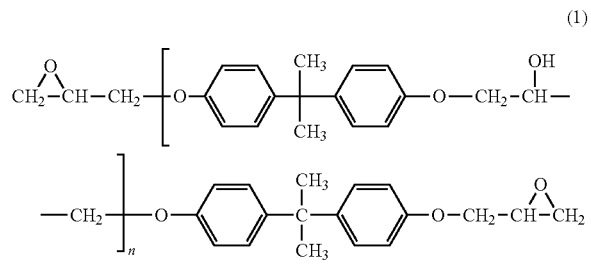

where n is an integer of 1 to 4
and a bisphenol compound selected from the group consisting of bisphenol A, bisphenol F, bisphenol S, bisphenol B, bisphenol E, and bisphenol P.

20 Claims, 3 Drawing Sheets

(56) References Cited

U.S. PATENT DOCUMENTS

2018/0100043 A1     4/2018  Takishima et al.
2018/0361685 A1*   12/2018  Fujita ..................... B29C 70/06

FOREIGN PATENT DOCUMENTS

| | | |
|---|---|---|
| JP | 2006233188 A * | 9/2006 |
| JP | 2006-321897 | 11/2006 |
| JP | 2016-11403 | 1/2016 |
| JP | 6176691 | 7/2017 |
| JP | 6176691 | 8/2017 |
| JP | 2018-30986 | 3/2018 |
| JP | 2018-62641 | 4/2018 |
| JP | 2018-203907 | 12/2018 |
| JP | 2019-72963 | 5/2019 |
| WO | WO 2004/060981 | 7/2004 |
| WO | WO 2015/105051 | 7/2015 |
| WO | WO 2016/017080 | 2/2016 |
| WO | WO-2017090551 A1 * | 6/2017 ............. B29C 70/06 |

OTHER PUBLICATIONS

Database WPI Week 199645 Thomson Scientific, London, GB; AN 1996-450990 XP002803524.
Database WPI Week 199746 Thomson Scientific, London, GB; AN 1997-498420 XP 002803523.
Extended Search Report for European Patent Application No. 19805505.5, dated Jul. 13, 2021, 9 pages.

* cited by examiner

FIBER-REINFORCED THERMOPLASTIC RESIN SHEET, MOLDED BODY OF FIBER-REINFORCED THERMOPLASTIC RESIN SHEET, AND MANUFACTURING METHOD OF FIBER-REINFORCED THERMOPLASTIC RESIN SHEET

CROSS-REFERENCE TO RELATED APPLICATION(S)

This application is a national stage application under 35 U.S.C. 371 and claims the benefit of PCT Application No. PCT/JP2019/025974 having an international filing date of 28 Jun. 2019, which designated the United States, which PCT application claims the benefit of priority of Japanese Patent Application No. 2018-227566 filed on Dec. 4, 2018 under the Paris Convention for the protection of industrial property, the entire contents of which are incorporated herein by reference.

TECHNICAL FIELD

This patent application claims the benefit of priority of Japanese Patent Application No. 2018-227566 (filed on Dec. 4, 2018) under the Paris Convention for the protection of industrial property, the entire contents of which are incorporated herein by reference.

The present invention relates to a fiber-reinforced thermoplastic resin sheet which is a random laminated body of a tape-shaped unidirectional prepreg and contains spread reinforcement fibers and a specific polymer, a molded body of the fiber-reinforced thermoplastic resin sheet, and a manufacturing method of a fiber-reinforced thermoplastic resin sheet.

BACKGROUND ART

Fiber-reinforced plastics (FRP) are composite materials which contain a thermosetting resin or a thermoplastic resin as a matrix and further contain reinforcement fibers such as carbon fibers and glass fibers in the resin. Fiber-reinforced plastics of which the matrix is a thermoplastic resin are used in a wide range of fields such as tanks, containers, ships, and automobiles.

As fiber-reinforced plastics, for example, Patent Documents 1 and 2 describe fiber-reinforced thermoplastic resin sheets which are random laminated bodies of unidirectional prepregs in which a polymer of a bisphenol A type epoxy compound and a bisphenol compound is contained in spread reinforcement fibers.

PRIOR ART DOCUMENTS

Patent Documents

Patent Document 1: JP-B-6176691
Patent Document 2: JP-A-2018-62641

SUMMARY OF THE INVENTION

Problems to be Solved by the Invention

The fiber-reinforced thermoplastic resin sheets disclosed in Patent Documents 1 and 2 contain spread reinforcement fibers until the average content number of the reinforcement fibers in the thickness direction of the unidirectional prepreg becomes equal to or less than a specific value and exhibit excellent moldability, but there is still a need to find a method for improving the moldability of fiber-reinforced thermoplastic resin sheets. For example, it is conceivable to shorten the fiber length of the reinforcement fibers to be contained in the fiber-reinforced thermoplastic resin sheet in order to improve the moldability, but the strength of the fiber-reinforced thermoplastic resin sheet may decrease in this case. In addition, a molded body manufactured using a fiber-reinforced thermoplastic resin sheet is also required to have a smooth surface, but in the case of conventional fiber-reinforced thermoplastic resin sheets, cavities and unevenness may be generated on the surface of the molded body and the appearance quality may be diminished by the separation of fibers and matrix resin from each other, the difference in shrinkage between the fibers and the matrix resin, and the like.

Hence, an object of the present invention is to provide a fiber-reinforced thermoplastic resin sheet which can be manufactured into a molded body exhibiting excellent appearance quality as well as exhibits both high moldability and strength.

Solutions to the Problems

The present inventors have carried out investigations to find a new method for improving the moldability of a fiber-reinforced thermoplastic resin sheet and the appearance quality of a molded body to be acquired. As a result, they have been surprisingly found out that the appearance quality of a molded body to be acquired can be improved as well as excellent moldability can be attained without significantly decreasing the strength of the fiber-reinforced thermoplastic resin sheet in a case where a fiber-reinforced thermoplastic resin sheet is heated, thus the weight average molecular weight of a polymer contained in the fiber-reinforced thermoplastic resin sheet is in a predetermined range, and the rate of increase in the weight average molecular weight of the polymer before and after heating is in a predetermined range, and have been completed the present invention.

In other words, the present invention includes the following suitable aspects.

[1] A fiber-reinforced thermoplastic resin sheet which is a random laminated body of a tape-shaped unidirectional prepreg, the fiber-reinforced thermoplastic resin sheet comprising spread reinforcement fibers and a polymer (a), in which the polymer (a) is a polymer of at least a bisphenol A type epoxy compound represented by Formula (1):

[Chem. 1]

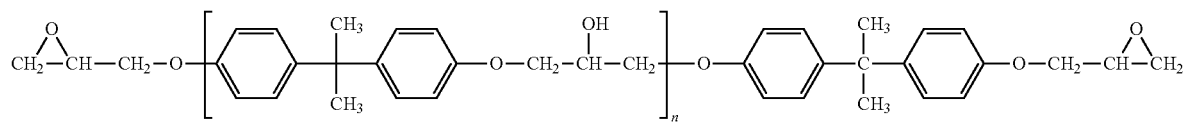

(1)

[where n is an integer of 1 to 4]

and a bisphenol compound selected from the group consisting of bisphenol A, bisphenol F, bisphenol S, bisphenol B, bisphenol E, and bisphenol P, and $M_{wa}$ is 25,000 or more and a proportion ($M_{wb}/M_{wa}$) of $M_{wb}$ to $M_{wa}$ is 1.01 to 1.8, where $M_{wa}$ denotes a weight average molecular weight of the polymer (a) and $M_{wb}$ denotes a weight average molecular weight of a polymer (b) contained in a heat-treated fiber-reinforced thermoplastic resin sheet acquired by heating the fiber-reinforced thermoplastic resin sheet at 180° C. for 1 hour.

[2] The fiber-reinforced thermoplastic resin sheet according to [1], in which the weight average molecular weight $M_{wa}$ of the polymer (a) is 26,000 to 140,000.

[3] The fiber-reinforced thermoplastic resin sheet according to [1] or [2], in which a number average molecular weight $M_{na}$ of the polymer (a) is 8,000 to 20,000.

[4] The fiber-reinforced thermoplastic resin sheet according to any one of [1] to [3], in which a molecular weight distribution $M_{wa}/M_{na}$, which is a ratio of the weight average molecular weight $M_{wa}$ to the number average molecular weight $M_{na}$ of the polymer (a), is 3 to 10.

[5] The fiber-reinforced thermoplastic resin sheet according to any one of [1] to [4], in which Xa and Xb satisfy Formula (2):

$$1.5 \geq (100-Xb)/(100-Xa) \geq 1.0 \qquad (2)$$

where Xa denotes a proportion (%) of a component having a molecular weight of 100,000 or less in an integral molecular weight distribution curve of the polymer (a) by GPC method and Xb denotes a proportion (%) of a component having a molecular weight of 100,000 or less in an integral molecular weight distribution curve of the polymer (b) by GPC method.

[6] The fiber-reinforced thermoplastic resin sheet according to any one of [1] to [5], in which the proportion (Xa %) of the component having the molecular weight of 100,000 or less in the integral molecular weight distribution curve of the polymer (a) by GPC method is 60 to 96%.

[7] The fiber-reinforced thermoplastic resin sheet according to any one of [1] to [6], in which a proportion (Ya %) of a component having a molecular weight of 10,000 or less in the integral molecular weight distribution curve of the polymer (a) by GPC method is 20 to 40%.

[8] The fiber-reinforced thermoplastic resin sheet according to any one of [1] to [7], in which an average content number of the reinforcement fibers in a thickness direction of the unidirectional prepreg is 20 or less.

[9] The fiber-reinforced thermoplastic resin sheet according to any one of [1] to [8], in which an average content density of the reinforcement fibers in a width direction of the unidirectional prepreg is 150 to 2000 fibers/mm when being calculated by following Formula (3):

[Math. 1]

average content density [fibers/mm] of reinforcement fibers in width direction=(average content number [fibers] of reinforcement fibers in thickness direction)×(1/single yarn diameter [mm] of reinforcement fibers)    (3).

[10] The fiber-reinforced thermoplastic resin sheet according to any one of [1] to [9], in which a length in a fiber direction of the unidirectional prepreg is 10 to 50 mm in a fiber direction.

[11] The fiber-reinforced thermoplastic resin sheet according to any one of [1] to [10], in which the reinforcement fiber is a carbon fiber.

[12] The fiber-reinforced thermoplastic resin sheet according to any one of [1] to [11], in which a number of layers of the unidirectional prepregs per unit thickness of the fiber-reinforced thermoplastic resin sheet is 6 to 40 layers/mm.

[13] The fiber-reinforced thermoplastic resin sheet according to any one of [1] to [12], in which $M_{wa}$ is 26,000 to 140,000 and a proportion ($M_{wb}/M_{wa}$) of $M_{wb}$ to $M_{wa}$ is 1.05 to 1.8.

[14] A molded body of the fiber-reinforced thermoplastic resin sheet according to any one of [1] to [13].

[15] A manufacturing method of a fiber-reinforced thermoplastic resin sheet at least comprising:

(a) a step of spreading reinforcement fibers;

(b) a step of impregnating spread reinforcement fibers with a bisphenol A type epoxy compound represented by Formula (1):

[Chem. 2]

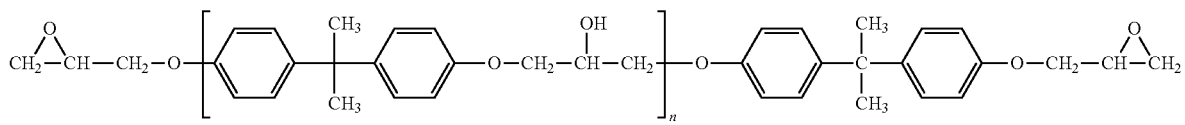

(1)

[where n is an integer of 1 to 4], a bisphenol compound selected from the group consisting of bisphenol A, bisphenol F, bisphenol S, bisphenol B, bisphenol E, and bisphenol P, and at least one compound having one reactive group in one molecule, in which the reactive group is a hydroxyl group or an epoxy group;

(c) a step of heating the reinforcement fibers impregnated with the compounds to polymerize the compounds impregnated in the reinforcement fibers until a weight average molecular weight of an acquired polymer becomes 5,000 to 25,000 to acquire a unidirectional prepreg;

(d) a step of randomly laminating the unidirectional prepreg to acquire a laminate; and (e) a step of heating the laminate at a temperature of 100° C. to 200° C. to acquire a fiber-reinforced thermoplastic resin sheet.

[16] The manufacturing method according to [15], in which the compound having one reactive group in one molecule is impregnated in an amount to be at 0.1 to 8 mass % with respect to a total amount of the bisphenol A type epoxy compound represented by Formula (1) and the bisphenol compound in step (b).

[17] The manufacturing method according to [15] or [16], in which the compound having one reactive group in one molecule is a monofunctional epoxy compound.

Effects of the Invention

According to the present invention, it is possible to provide a fiber-reinforced thermoplastic resin sheet which can be manufactured into a molded body exhibiting excellent appearance quality as well as exhibits both high moldability and strength.

EMBODIMENTS OF THE INVENTION

Figure 1:
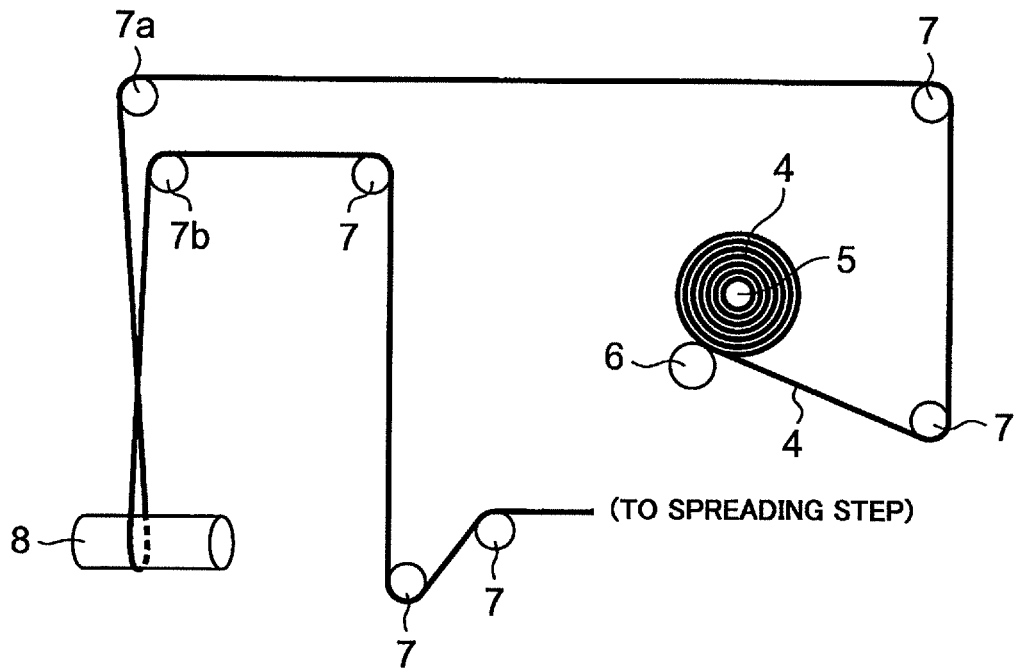
FIG. 1 is a schematic side view of an apparatus including a traverse guide.

Hereinafter, embodiments of the present invention will be described in detail. Note that, the scope of the present invention is not limited to the embodiments described here, and various modifications can be made without departing from the spirit of the present invention.

<Fiber-Reinforced Thermoplastic Resin Sheet>

A fiber-reinforced thermoplastic resin sheet of the present invention contains spread reinforcement fibers and a polymer (a), and a proportion ($M_{wb}/M_{wa}$) of $M_{wb}$ to $M_{wa}$ is 1.01 to 1.8, preferably 1.05 to 1.8, more preferably 1.05 to 1.4, and still more preferably 1.05 to 1.2, where $M_{wa}$ denotes a weight average molecular weight of the polymer (a) and $M_{wb}$ denotes a weight average molecular weight of a polymer (b) contained in a heat-treated fiber-reinforced thermoplastic resin sheet acquired by heating the fiber-reinforced thermoplastic resin sheet at 180° C. for 1 hour. Hereinafter, the proportion ($M_{wb}/M_{wa}$) of $M_{wb}$ to $M_{wa}$ is also referred to as "proportion M".

In a case where the proportion M is less than 1.01, further polymerization of the polymer (a) contained in the fiber-reinforced thermoplastic resin sheet insufficiently proceeds when a molded body is manufactured from the fiber-reinforced thermoplastic resin sheet. Moreover, in a case where the proportion M is less than 1.01, the strength of the fiber-reinforced thermoplastic resin sheet itself is also insufficient. Particularly, in a case where the proportion M is less than 1.0, it is considered that the polymer (a) is decomposed and the like at 180° C. In these cases, the molded body to be acquired cannot have sufficient strength. Moreover, in a case where the proportion M exceeds 1.8, as further polymerization of the polymer (a) contained in the fiber-reinforced thermoplastic resin sheet proceeds too much when a molded body is manufactured from the fiber-reinforced thermoplastic resin sheet, the ability to follow the mold shape at the time of molding is not attained and it is not possible to attain sufficient appearance quality of the molded body manufactured from the fiber-reinforced thermoplastic resin sheet as well as moldability is diminished. In a case where the proportion M is 1.01 to 1.8, preferably 1.05 to 1.8, it is possible to attain sufficient appearance quality of the molded body manufactured from the fiber-reinforced thermoplastic resin sheet as well as to achieve both the strength of the fiber-reinforced thermoplastic resin sheet and the moldability when a molded body is manufactured. In this case, the strength of the molded body can also be increased.

The reason why the moldability and strength of the fiber-reinforced thermoplastic resin sheet are improved, and as a result, the strength of the molded body is improved by setting the proportion M to the above range is not clear. However, in the present invention, it is considered to be important that the polymer contained in the unidirectional prepreg or the polymer (a) contained in the sheet is properly further polymerized when a fiber-reinforced thermoplastic resin sheet is manufactured from a unidirectional prepreg and when a molded body is manufactured from a fiber-reinforced thermoplastic resin sheet in order to improve the strength of the fiber-reinforced thermoplastic resin sheet and molded body. In a case where the proportion M is in the above range, at the time of manufacture of the fiber-reinforced thermoplastic resin sheet, it can be said that proper polymerization proceeds even when the polymer contained in the unidirectional prepreg is polymerized into the polymer (a), and as a result, it is considered that the mechanical strength of the fiber-reinforced thermoplastic resin sheet itself is increased. Moreover, in order to improve the strength of the molded body, it is considered to be important that the polymer (a) contained in the sheet is properly further polymerized when the sheet is transformed into the shape of the molded body as well as the strength of the fiber-reinforced thermoplastic resin sheet itself is high. Here, it is considered that further polymerization of the in-situ polymerization type thermoplastic resin is performed not only in one unidirectional prepreg contained in the fiber-reinforced thermoplastic resin sheet but also between adjacent unidirectional prepregs when a molded body is manufactured from the fiber-reinforced thermoplastic resin sheet. As a result, it is considered that the unidirectional prepregs in the fiber-reinforced thermoplastic resin sheet are more firmly bonded to each other and high strength is achieved. Moreover, in the fiber-reinforced thermoplastic resin sheet of the present invention, it is considered that it is possible to improve the moldability without lowering the softening temperature of the matrix resin contained in the fiber-reinforced thermoplastic resin sheet and thus to provide a fiber-reinforced thermoplastic resin sheet which can be manufactured into a molded body exhibiting excellent appearance quality as well as exhibits both high moldability and strength by setting the proportion M to the above range.

However, in a case where the proportion M is not in the above range and the polymerization rate of further polymerization of the in-situ polymerization type thermoplastic resin is too high, for example, in a case where components having a high molecular weight are excessively produced by the polymerization, a case where the reinforcement fibers and matrix resin contained in the thermoplastic resin sheet are separated from each other by the pressure at the time of molding, and the like, the ability to follow the mold is impaired in the process of manufacturing a molded body from the fiber-reinforced thermoplastic resin sheet and sufficient formativeness and favorable appearance quality may not be attained. Moreover, a high pressure and a high temperature may be required in order to attain a desired shape. As a result, the strength of the molded body to be acquired may decrease. Note that, in the present specification, the improvement of moldability means that molding can be performed at a lower pressure, molding can be performed at a lower temperature, and/or molding into a more complicated shape can be performed. In addition, in a case where the proportion M is not in the above range and further polymerization of the in-situ polymerization type thermoplastic resin hardly takes place, sufficient strength may not be attained, particularly, it may not be said that the sheet is suitable for uses which are required to exhibit high mechanical strength, such as secondary structural materials for automobiles.

The fiber-reinforced thermoplastic resin sheet of the present invention in which the proportion M is in the above range can be press-molded at a lower pressure as compared to a conventional fiber-reinforced thermoplastic resin sheet. As a result, when press molding (particularly cold press molding) is performed, the reinforcement fibers contained in the fiber-reinforced thermoplastic resin sheet are easily contained in the molded body in a state of maintaining the shape in the unidirectional prepreg (for example, unidirectionality in each unidirectional prepreg). It is considered that the strength inherent to the fiber-reinforced thermoplastic resin sheet is hardly impaired by this and it is thus easy to suppress variations in physical properties of the molded body to be acquired as well as to increase the strength of the molded body.

Furthermore, it is considered that in a case where the proportion M is in the above range, the ability of the composition containing reinforcement fibers and a thermoplastic resin to follow the mold shape is improved when a molded body is manufactured from the fiber-reinforced thermoplastic resin sheet, and as a result, variations in mechanical strength of the molded body to be acquired are suppressed. In this point as well, the strength of the molded body to be acquired is easily improved. It is also possible to improve the appearance quality of the molded body to be acquired.

The proportion M is 1.8 or less, preferably 1.6 or less, more preferably 1.5 or less, still more preferably 1.4 or less, and particularly preferably 1.3 or less from the viewpoint of easily improving the moldability of the fiber-reinforced thermoplastic resin sheet. In addition, the proportion M is 1.05 or more, preferably 1.10 or more, more preferably 1.15 or more, still more preferably 1.20 or more, and particularly preferably 1.25 or more from the viewpoint of easily increasing the strength of the fiber-reinforced thermoplastic resin sheet and easily increasing the strength of the molded body to be acquired from the sheet.

The method for setting the proportion M to the above range is not particularly limited, but examples thereof include a method in which the fiber-reinforced thermoplastic resin sheet is manufactured through a step of impregnating the spread reinforcement fibers with a bisphenol A type epoxy compound, a bisphenol compound, and a compound having one reactive group in one molecule (for example, a monofunctional epoxy compound or a compound having one hydroxyl group in one molecule). The proportion M can be set to the above range by adjusting the heating temperature and the heating time in the manufacturing process as well as adjusting the amount of the compound having one reactive group in one molecule added.

The fiber-reinforced thermoplastic resin sheet of the present invention contains spread reinforcement fibers and a specific polymer (a), and a heat-treated fiber-reinforced thermoplastic resin sheet acquired by heating the fiber-reinforced thermoplastic resin sheet at 180° C. for 1 hour contains a specific polymer (b). Here, the polymer (a) is a polymer contained in the fiber-reinforced thermoplastic resin sheet of the present invention and the polymer can be acquired from the fiber-reinforced thermoplastic resin sheet of the present invention by extracting polymers contained in the sheet using a solvent (for example, tetrahydrofuran) which can dissolve the polymer. The polymer (b) is a polymer contained in the heat-treated fiber-reinforced thermoplastic resin sheet acquired by heating the fiber-reinforced thermoplastic resin sheet at 180° C. for 1 hour and the polymer can be acquired from the heat-treated fiber-reinforced thermoplastic resin sheet by extracting polymers contained in the sheet using a solvent (for example, tetrahydrofuran) which can dissolve the polymer. Note that, the polymer (b) contained in the heat-treated fiber-reinforced thermoplastic resin sheet is a polymer acquired by further polymerizing the polymer (a) by heating at 180° C. for 1 hour.

The weight average molecular weight $M_{wa}$ of the polymer (a) is 25,000 or more, preferably 25,000 to 140,000, more preferably 26,000 to 100,000, still more preferably 27,000 to 80,000, and yet more preferably 28,000 to 75,000. In a case where the weight average molecular weight $M_{wa}$ of the polymer (a) is less than 25,000, it is not possible to sufficiently increase the strength of the molded body to be acquired. In a case where the weight average molecular weight $M_{wa}$ is equal to or more than the lower limit, the mechanical strength of the fiber-reinforced thermoplastic resin sheet is easily increased and sufficient mechanical strength as a molded body is easily attained. In addition, in a case where the weight average molecular weight $M_{wa}$ is equal to or less than the upper limit, the moldability of the fiber-reinforced thermoplastic resin sheet of the present invention is easily improved. It is preferable that the proportion M in the above range and the weight average molecular weight $M_{wa}$ in the above range are satisfied since it is easy to improve both the physical properties, such as mechanical strength of the molded body acquired from the fiber-reinforced thermoplastic resin sheet and the moldability of the fiber-reinforced thermoplastic resin sheet. Moreover, it is also easy to improve the appearance quality of the molded body to be acquired. From the viewpoint of moldability, the weight average molecular weight $M_{wa}$ of the polymer (a) may be 50,000 or less, 40,000 or less, and the like. From the viewpoint of the mechanical strength of the fiber-reinforced thermoplastic resin sheet and molded body, the weight average molecular weight $M_{wa}$ of the polymer (a) may be 30,000 or more, 40,000 or more, and the like. When a molded body is manufactured from the fiber-reinforced thermoplastic resin sheet by pressing and the like, the fiber-reinforced thermoplastic resin sheet may be heated. In a case where the fiber-reinforced thermoplastic resin sheet in a heated state is likely to sag, the conveying property deteriorates and the handleability of the sheet is diminished. From the viewpoint of easily enhancing the moldability and handleability of the sheet, the weight average molecular weight $M_{wa}$ of the polymer (a) is preferably 35,000 to 140,000, more preferably 40,000 to 100,000, and still more preferably 40,000 to 80,000.

The number average molecular weight $M_{na}$ of the polymer (a) is preferably 8,000 to 20,000. In a case where the number average molecular weight $M_{na}$ is in the above range, the $M_{wa}/M_{na}$ (dispersion ratio) to be presented below is small and it is thus easy to suppress variations in mechanical strength of the molded body.

The molecular weight distribution $M_{wa}/M_{na}$, which is the ratio of the weight average molecular weight $M_{wa}$ to the number average molecular weight $M_{na}$ of the polymer (a), is preferably 3 to 10, more preferably 3.1 to 8, still more preferably 3.2 to 7, yet more preferably 3.2 to 6, and particularly preferably 3.2 to 5. In a case where the molecular weight distribution $M_{wa}/M_{na}$ is in the above range, it is easy to suppress variations in mechanical strength of the molded body.

The weight average molecular weight $M_{wb}$ of the polymer (b) is preferably a value so that the weight average molecular weight $M_{wa}$ of the polymer (a) is in the above preferred range and the proportion M is in the above preferred range. Such a value is preferably 27,300 to 252,000. In a case where the weight average molecular weight $M_{wb}$ is in the above range, the moldability and mechanical strength of the fiber-reinforced thermoplastic resin sheet are easily increased and the mechanical strength of the molded body is easily increased. From the viewpoint of more easily enhancing the moldability of the fiber-reinforced thermoplastic resin sheet of the present invention, the weight average molecular weight $M_{wb}$ may be preferably 30,000 to 80,000 and more preferably 30,000 to 50,000.

The number average molecular weight $M_{nb}$ of the polymer (b) is preferably 8,000 to 20,000. In a case where the number average molecular weight $M_{nb}$ is in the above range, the mechanical strength of the fiber-reinforced thermoplastic resin sheet and molded body is easily increased and variations in mechanical strength are also easily suppressed.

The molecular weight distribution $M_{wb}/M_{nb}$, which is the ratio of the weight average molecular weight $M_{wb}$ to the number average molecular weight $M_{nb}$ of the polymer (b), is preferably 3 to 8, more preferably 3 to 6, and still more preferably 3 to 5. In a case where the molecular weight distribution $M_{wb}/M_{nb}$ is in the above range, the mechanical strength of the fiber-reinforced thermoplastic resin sheet and molded body is easily increased and variations in mechanical strength are also easily suppressed.

The proportion $((M_{wb}/M_{nb})/(M_{wa}/M_{na}))$ of the molecular weight distribution $M_{wb}/M_{nb}$ of the polymer (b) to the molecular weight distribution $M_{wa}/M_{na}$ of the polymer (a) is preferably 1.00 to 1.50, more preferably 1.00 to 1.30, and still more preferably 1.05 to 1.25. In a case where the proportion is in the above range, it is easy to manufacture a molded body in a state of maintaining the mechanical strength and moldability of the sheet.

In the present specification, the weight average molecular weight and number average molecular weight of a polymer are measured by gel permeation chromatography (GPC) using the thermoplastic resin (polymer a) contained in the fiber-reinforced thermoplastic resin sheet or the thermoplastic resin (polymer b) contained in the heat-treated fiber-reinforced thermoplastic resin sheet as a measurement sample.

Specific measurement conditions are as described in Examples.

It is preferable that Xa and Xb satisfy Formula (2):

$$1.5 \geq (100-Xb)/(100-Xa) \geq 1.0 \quad (2)$$

where Xa denotes the proportion (%) of a component having a molecular weight of 100,000 or less in the integral molecular weight distribution curve of the polymer (a) by GPC method and Xb denotes the proportion (%) of a component having a molecular weight of 100,000 or less in the integral molecular weight distribution curve of the polymer (b) by GPC method. Hereinafter, the value calculated by the formula of (100–Xb)/(100–Xa) is also referred to as "value X". (100–Xb) in Formula (2) represents the proportion of components which have a molecular weight exceeding 100,000 and are contained in the polymer (b), and (100–Xa) in Formula (2) represents the proportion of components which have a molecular weight exceeding 100,000 and are contained in the polymer (a). Hence, the value X represents the proportion of components which have a molecular weight exceeding 100,000 and have increased in the step of heating the fiber-reinforced thermoplastic resin sheet at 180° C. for 1 hour.

The upper limit of the value X is preferably 1.5 or less, more preferably 1.4 or less, still more preferably 1.3 or less, and particularly preferably 1.2 or less from the viewpoint of easily improving the moldability of the fiber-reinforced thermoplastic resin sheet. The lower limit of the value X is preferably 1.0 or more, more preferably 1.05 or more, and still more preferably 1.1 or more from the viewpoint of easily maintaining the strength of the fiber-reinforced thermoplastic resin sheet and molded body.

The proportion (Xa %) of components having a molecular weight of 100,000 or less in the integral molecular weight distribution curve of the polymer (a) by GPC method is preferably 60 to 96%, more preferably 70 to 96%, and still more preferably 80 to 96%. In a case where the proportion Xa is equal to or more than the lower limit, the mechanical strength of the fiber-reinforced thermoplastic resin sheet and molded body is easily increased. In addition, in a case where the proportion Xa is equal to or less than the upper limit, the moldability of the sheet is easily enhanced.

The proportion (Xb %) of components having a molecular weight of 100,000 or less in the integral molecular weight distribution curve of the polymer (b) by GPC method is preferably 60 to 96%, more preferably 75 to 96%, and still more preferably 80 to 96%. In a case where the proportion Xb is equal to or more than the lower limit, the mechanical strength of the fiber-reinforced thermoplastic resin sheet and molded body is easily improved. In addition, in a case where the proportion Xb is equal to or less than the upper limit, it is easy to improve the transfer property of the molded body and to manufacture a molded body exhibiting excellent appearance quality.

The proportion (Ya %) of components having a molecular weight of 10,000 or less in the integral molecular weight distribution curve of the polymer (a) by GPC method is preferably 20 to 40%, more preferably 25 to 40%, and still more preferably 30 to 40%. In addition, in a case where the proportion Ya is equal to or more than the lower limit, the moldability of the sheet is easily improved. In addition, in a case where the proportion Ya is equal to or less than the upper limit, the mechanical strength of the sheet is easily improved.

The integral molecular weight distribution curve by GPC method is measured by gel permeation chromatography (GPC) using the thermoplastic resin (polymer a) contained in the fiber-reinforced thermoplastic resin sheet or the thermoplastic resin (polymer b) contained in the heat-treated fiber-reinforced thermoplastic resin sheet as a measurement sample in the same manner as the weight average molecular weight of the polymer. Specific measurement conditions are as described in Examples.

The compressibility ratio of the fiber-reinforced thermoplastic resin sheet of the present invention is preferably 23% or more, more preferably 25% or more, still more preferably 30% or more, still more preferably 35% or more, and particularly preferably 40% or more from the viewpoint of easily improving the moldability of the fiber-reinforced thermoplastic resin sheet. In addition, the upper limit of the compressibility ratio is not particularly limited and may be about 80% or less and 70% or less. In the present specification, the compressibility ratio is a value attained by measuring the thickness of the sheet before and after pressing when the fiber-reinforced thermoplastic resin sheet is extended by applying pressure under the conditions of a resin sheet heating temperature of 220° C., a mold temperature of 110° C., and a press pressure of 20 MPa and calculating the ratio of the difference in sheet thickness before and after pressing (the amount of change in sheet thickness before and after pressing) with respect to the sheet thickness before pressing as proportion (%). Details of the measuring method of the compressibility ratio are as presented in Examples. A high compressibility ratio is one of the indexes which indicate that the moldability of the fiber-reinforced thermoplastic resin sheet is favorable. The compressibility ratio varies depending on the kinds of reinforcement fibers contained in the fiber-reinforced thermoplastic resin sheet, the kinds of resins, the sheet thickness, the fiber volume fraction (Vf), the number of reinforcement fibers in the thickness direction contained in the unidirectional prepreg, and the like. The fiber-reinforced thermoplastic resin sheet according to the present invention has a superior compressibility ratio, that is, exhibits superior moldability as compared to fiber-reinforced thermoplastic resin sheets not according to the present invention in a case where the kinds of reinforcement fibers and the like are set to be under the same conditions.

The complex viscosity of the fiber-reinforced thermoplastic resin sheet of the present invention at 180° C. is preferably 500 to 13,000 Pa·s, more preferably 800 to 12,500 Pa·s, still more preferably 1,000 to 12,000 Pa·s, yet more preferably 1,300 to 9,000 Pa·s, particularly preferably 1,300 to 6,000 Pa·s, and most preferably 1,300 to 3,000 Pa·s. In a case where the complex viscosity is in the above range, it is easy to increase the mechanical strength of the fiber-reinforced thermoplastic resin sheet and the molded body to be acquired while maintaining the moldability of the fiber-reinforced thermoplastic resin sheet. Moreover, it is easy to enhance the handleability of the fiber-reinforced thermoplastic resin sheet at the time of molding. It is easy to enhance the moldability of the fiber-reinforced thermoplastic resin sheet particularly in a case where the complex viscosity is equal to or less than the upper limit. The shape of the prepreg contained in the fiber-reinforced thermoplastic resin sheet is easily maintained in the molded body to be acquired and it is thus easy to increase the mechanical strength and to suppress variations in mechanical strength in a case where the complex viscosity is equal to or more than the lower limit. Moreover, the affinity between the reinforcement fibers and matrix resin contained in the fiber-reinforced thermoplastic resin sheet is favorable and the appearance quality of the molded body to be acquired is easily improved. Furthermore, it is easy to enhance the handleability of the fiber-reinforced thermoplastic resin sheet at the time of molding. Specifically, for example, it is easy to perform molding even in the case of using molds having a boss rib shape, a complex shape such as a honeycomb structure, a grained skin in heat and cool molding (hot press), and flowability is ensured in a state in which the prepreg shape is maintained and thus a molded body exhibiting excellent surface appearance and mold transfer property can be acquired in stamping molding (cold press). The complex viscosity of the fiber-reinforced thermoplastic resin sheet at 180° C. is measured at 180° C. using a rotary viscometer (rheometer), for example, under the conditions of a strain of 3% and a frequency of 1 Hz and can be measured, for example, under the conditions described in Examples.

The complex viscosity at 180° C. is preferably a complex viscosity in a case where the fiber volume fraction (Vf) in the fiber-reinforced thermoplastic resin sheet of the present invention is preferably 10 to 80%, more preferably 15 to 60%, still more preferably 20 to 55%, yet more preferably 25 to 45%, yet more preferably 30 to 45%, yet more preferably 35 to 45%, and particularly preferably 37.5 to 42.5%. The fiber volume fraction (Vf) is measured, for example, in conformity with JIS-7075, and the fiber volume fraction measured for the unidirectional prepreg contained in the fiber-reinforced thermoplastic resin sheet may be taken as the fiber volume fraction of the fiber-reinforced thermoplastic resin sheet.

With regard to the complex viscosity of the fiber-reinforced thermoplastic resin sheet of the present invention at 180° C., it is preferable that both the maximum value and minimum value of the complex viscosity measured when the measurement is performed for 1 hour under the above measurement conditions are in the above range. The fiber-reinforced thermoplastic resin sheet as described above is considered to exhibit uniform moldability under molding conditions since the change in complex viscosity under the condition of 180° C. for 1 hour can be suppressed in a certain range.

The number of layers of unidirectional prepregs per unit thickness of the fiber-reinforced thermoplastic resin sheet of the present invention is preferably 6 layers/mm or more, more preferably 8 layers/mm or more, still more preferably 10 layers/mm or more, and particularly preferably 11 layers/mm or more. In a case where the number of layers of unidirectional prepregs per unit thickness is equal to or more than the lower limit, it is easy to increase the strength of the molded body acquired from the resin sheet of the present invention. In addition, the number of layers of unidirectional prepregs per unit thickness is preferably 40 layers/mm or less, more preferably 25 layers/mm or less, and particularly preferably 20 layers/mm or less. In a case where the number of layers of unidirectional prepregs per unit thickness is equal to or less than the upper limit, it is easy to improve the isotropy of the fiber-reinforced thermoplastic resin sheet. In addition, the number of layers of unidirectional prepregs per unit thickness of the fiber-reinforced thermoplastic resin sheet of the present invention is visually measured from the image of the cross section of the fiber-reinforced thermoplastic resin sheet observed under an electron or optical microscope.

The void fraction of the fiber-reinforced thermoplastic resin sheet of the present invention is preferably 0 to 1 vol % and more preferably 0 to 0.5 vol % when being measured in conformity with JIS-7075 preferably in a fiber-reinforced thermoplastic sheet having an average thickness of 2 mm. The fiber-reinforced thermoplastic resin sheet having such a low void fraction exhibits significantly excellent moldability, and it is also easy to increase the mechanical strength of the molded body to be acquired.

The mechanical strength such as tensile strength of the fiber-reinforced thermoplastic resin sheet of the present invention varies depending on the kinds of reinforcement fibers contained in the fiber-reinforced thermoplastic resin sheet, the kinds of resins, the sheet thickness, the fiber volume fraction (Vf) and the like and can be set by appropriately selecting the above according to the strength desired for the molded body acquired from the fiber-reinforced thermoplastic resin sheet. From the viewpoint of easy use in the field of secondary structural materials for automobiles in which the fiber-reinforced thermoplastic resin sheet of the present invention is suitably used, the bending strength of the fiber-reinforced thermoplastic resin sheet of the present invention measured in conformity with ASTM D790 is preferably 300 MPa or more, more preferably 400 MPa or more, still more preferably 440 MPa or more, particularly preferably 450 MPa or more, and most preferably 460 MPa or more. Note that, the bending strength may be an average bending strength. The fiber-reinforced thermoplastic resin sheet of the present invention can achieve strength, moldability, and appearance quality even in fields in which high bending strength as described above is required. In addition, from the same viewpoint, the bending elastic modulus of the fiber-reinforced thermoplastic resin sheet of the present invention measured in conformity with ASTM D790 is preferably 25 GPa or more and more preferably 28 GPa or more, the tensile strength thereof measured in conformity with JIS K7164 (ISO527-4) is preferably 200 MPa or more and more preferably 250 MPa or more, and the tensile elastic modulus thereof is preferably 25 GPa or more and more preferably 28 GPa or more. The above physical property values are preferably the physical property values of a reinforced fiber thermoplastic resin sheet having, for example, an average thickness of 2 mm and a fiber volume fraction (Vf) of 40%. The bending physical properties and tensile physical properties are measured using a testing machine such as a universal testing machine manufactured by Shimadzu Corporation. The bending strength may be measured, for example, by the method described in Examples.

In a preferred embodiment of the present invention, in a case where the average content number of reinforcement fibers in the thickness direction in each unidirectional prepreg contained in the fiber-reinforced thermoplastic resin sheet is set to a predetermined value or less, it is easy to decrease the portions at which the fiber orientations are locally excessive, and as a result, the stress transmission in the direction different from the fiber axis direction via the fiber is likely to be uniform. In a case where the fiber-reinforced thermoplastic resin sheet of the present invention has the above features, it is considered that the variations in strength in all directions of the fiber-reinforced thermoplastic resin sheet further decrease. For this reason, in this case, the moldability is more favorable when a molded body is manufactured from the fiber-reinforced thermoplastic resin sheet of the present invention and it is easy to manufacture an isotropic molded body having less variations in strength.

The shape of the fiber-reinforced thermoplastic resin sheet of the present invention may be appropriately changed depending on the desired shape of the molded body and is not particularly limited.

The fiber-reinforced thermoplastic resin sheet of the present invention contains spread reinforcement fibers and a polymer (a), and the polymer (a) is a polymer of at least a bisphenol A type epoxy compound represented by Formula (1):

[where n is an integer of 1 to 4]

and a bisphenol compound selected from the group consisting of bisphenol A, bisphenol F, bisphenol S, bisphenol B, bisphenol E, and bisphenol P.

(Polymer a)

The polymer (a) contained in the fiber-reinforced thermoplastic resin sheet of the present invention is a polymer of at least a bisphenol A type epoxy compound represented by Formula (1) and a specific bisphenol compound. The polymer (a) is only required to be a polymer of a monomer mixture containing at least one bisphenol A type epoxy compound represented by Formula (1) and at least one bisphenol compound as monomer components and may be a polymer acquired by polymerizing a further compound in addition to the bisphenol A type epoxy compound represented by Formula (1) and a specific bisphenol compound. Examples of the further compound include a compound which has one reactive group which is an epoxy group or a hydroxyl group in one molecule and is described in the manufacturing method of the fiber-reinforced thermoplastic resin sheet of the present invention in detail.

The polymer (a) contained in the fiber-reinforced thermoplastic resin sheet of the present invention is an in-situ polymerization type thermoplastic resin. Note that, the polymer (a) which is a thermoplastic resin contained in the fiber-reinforced thermoplastic resin sheet of the present invention is hereinafter also referred to as the "thermoplastic resin (a)". In addition, a bisphenol A type epoxy compound represented by Formula (1) above, a bisphenol compound selected from the specific group, and a further compound such as a compound which has one reactive group which is an epoxy group or a hydroxyl group in one molecule and is optionally present, which are used as raw materials for the thermoplastic resin (a) are hereinafter also collectively referred to as the "raw material compounds". In addition, the in-situ polymerization type thermoplastic resin means that the polymer contained in the spread reinforcement fibers is further polymerized by heating and the like to become a polymer having a higher molecular weight in the present specification.

The polymer (a) contained in the fiber-reinforced thermoplastic resin sheet of the present invention is an in-situ polymerization type thermoplastic resin and is a polymer acquired by using at least a bisphenol A type epoxy compound represented by Formula (1):

[Chem. 3]

(1)

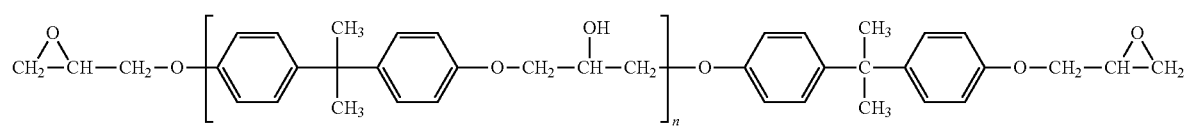

[Chem. 4]

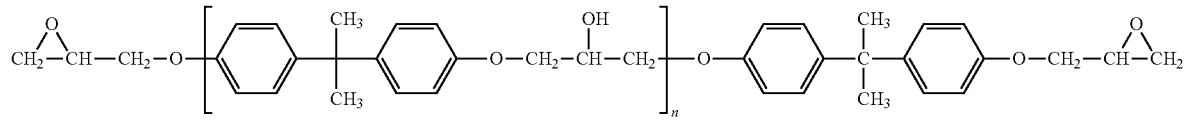

(1)

[where n is an integer of 1 to 4]

and a bisphenol compound selected from the group consisting of bisphenol A, bisphenol F, bisphenol S, bisphenol B, bisphenol E, and bisphenol P as raw materials. In the present invention, the polymer (a) is not limited as long as the proportion M in the above range is satisfied but may be, for example, a polymer acquired by further polymerizing a compound having one reactive group in one molecule in the step of acquiring the polymer. Here, the reactive group is an epoxy group or a hydroxyl group. The compound having one reactive group in one molecule is a compound having one epoxy group in one molecule (also referred to as "monofunctional epoxy compound" in the present specification) or a compound having one hydroxyl group in one molecule (also referred to as "monofunctional phenol compound" in the present specification). Note that, a compound having one epoxy group and one hydroxyl group in one molecule has two reactive groups in one molecule, thus is not included in the compound having one reactive group in one molecule in the present specification, and does not correspond to a monofunctional epoxy compound or a compound having one hydroxyl group in one molecule in the present specification.

In other words, the polymer (a) may be a polymer of the bisphenol A type epoxy compound represented by Formula (1), the specific bisphenol compound, and a compound having one reactive group which is an epoxy group or a hydroxyl group in one molecule and specifically may be a polymer of the bisphenol A type epoxy compound represented by Formula (1), the specific bisphenol compound, and the monofunctional epoxy compound or a polymer of the bisphenol A type epoxy compound represented by Formula (1), the specific bisphenol compound, and a compound having one hydroxyl group in one molecule.

The polymer (a) is a linear polymer acquired by linearly polymerizing the bisphenol A type epoxy compound and the bisphenol compound via the terminal reactive group (epoxy group) of the bisphenol A type epoxy compound represented by Formula (1) and the phenolic hydroxyl group of the bisphenol compound having two phenolic hydroxyl groups. The polymer (a) exhibits thermoplasticity by having such a structure.

The polymer acquired by the reaction of the terminal epoxy group of the bisphenol A type epoxy compound with the terminal phenolic hydroxyl group of the bisphenol compound is further polymerized with another bisphenol A type epoxy compound or bisphenol compound since the terminal thereof is an epoxy group or a phenolic hydroxyl group. Meanwhile, in a case where a compound having a phenolic hydroxyl group or an epoxy group at the terminal is polymerized with a compound having one reactive group in one molecule (monofunctional epoxy compound or compound having one hydroxyl group in one molecule), the terminal side which has been reacted with the compound having one reactive group in one molecule of the acquired polymer does not have a reactive group and thus does not contribute to the further polymerization reaction. For this reason, by adding a compound having one reactive group in one molecule when the bisphenol A type epoxy compound represented by Formula (1) and the bisphenol compound are polymerized, the rate of change (proportion M) in the weight average molecular weight of the polymer (a) contained in the acquired thermoplastic resin sheet before and after heating can be adjusted to be in a predetermined range, as a result, the moldability of the fiber-reinforced thermoplastic resin sheet can be further improved. Furthermore, by adding a compound having one reactive group in one molecule, it is easy to adjust the rate of change in the molecular weight distribution of the polymer (a) contained in the acquired thermoplastic resin sheet before and after heating to a predetermined range and/or to suppress an increase in polymerization components having a molecular weight of 100,000 or more, and as a result, the moldability of the fiber-reinforced thermoplastic resin sheet and the appearance quality of the molded body can be further improved.

For example, in step (b) to be described later, in a case where the compound having one reactive group in one molecule is impregnated as well as the bisphenol A type epoxy compound and the bisphenol compound used as raw materials are impregnated at a molar ratio of preferably 40:60 to 60:40, more preferably 45:65 to 55:45, and still more preferably 48:52 to 52:48, it is easy to adjust the rate of change (proportion M) in the weight average molecular weight of the polymer (a) before and after heating to a predetermined range.

The polymer (a) is an in-situ polymerization type polymer and is further polymerized in the step of manufacturing a molded body from the thermoplastic resin sheet. Specifically, for example, further polymerization of the polymer (a) and the bisphenol compound still contained in the thermoplastic resin sheet proceeds. For this reason, it is easy to increase the strength of the thermoplastic resin sheet, the moldability when the final molded body is manufactured, the strength of the molded body, and the like. Particularly in the fiber-reinforced thermoplastic resin sheet in which the in-situ polymerization type thermoplastic resin is used as the matrix resin, the polymerization of the thermoplastic resin can proceed at a high rate of polymerization even under preheating conditions when a molded body is manufactured through pressing using a mold, and thus sufficient moldability and formativeness may not be attained. Moreover, in a continuous manufacturing process of a molded body, a molded body having a certain quality with regard to moldability and/or strength may not be acquired by a difference in elapsed time from the start of manufacture, particularly a difference in heat history. By adjusting the rate of change (proportion M) in the weight average molecular weight of the polymer (a) contained in the fiber-reinforced thermoplastic resin sheet of the present invention before and after heating to a predetermined range, the problems as described above are solved and the moldability and strength of the fiber-reinforced thermoplastic resin sheet are improved.

The polymer (a) contained in the fiber-reinforced thermoplastic resin sheet of the present invention is a polymer of at least a bisphenol A type epoxy compound and a bisphenol compound used as raw materials, and the molecular weight of the bisphenol A type epoxy compound used as raw material before polymerization is 2000 or less.

The bisphenol A type epoxy compound is manufactured by a condensation reaction of bisphenol A and epichlorohydrin. Conventionally, a bisphenol A type epoxy resin is a typical resin as a thermosetting type synthetic resin and is three-dimensionally cured by reaction with various curative agents, so that cured resins having various characteristics can be acquired. On the other hand, as shown in Formula (1), the bisphenol A type epoxy compound used in the present invention has epoxy groups serving as functional groups only at both ends of the molecular chain, and a repeating unit n of the molecular chain is one to four. When n is one to four, the molecular weight of the bisphenol A type epoxy compound is 594 to 1416. Bisphenol A is one of the bisphenol compounds used as raw materials, is synthesized by a reaction of phenol and acetone, and has a structure represented by Formula (4):

[Chem. 5]

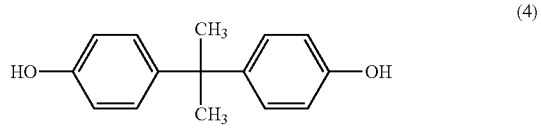

(4)

As shown in the formula (4), the phenolic hydroxyl groups serving as the functional groups are included at both ends of the molecule, and the molecular weight is 228. The other bisphenol compounds in the present invention, i.e., bisphenol F, bisphenol S, bisphenol B, bisphenol E, and bisphenol P, all have phenolic hydroxyl groups serving as the functional groups at both ends of the molecule and the molecular weight of 200 to 346. By using the raw materials having a low molecular weight as described above, the raw material compounds easily infiltrate between the spread reinforcement fibers at the time of manufacturing the prepreg, and the acquired prepreg is uniformly impregnated (fully impregnated) with the resin without containing voids between the fibers. From the same viewpoint, preferably, the raw material compounds are polymerized after the fibers are impregnated at the prepreg manufacturing step.

The functional group of the bisphenol A type epoxy compound represented by Formula (1) used as raw material is an epoxy group, and the functional group of the bisphenol compound as represented by Formula (4) is a phenolic hydroxyl group, for example. Therefore, the polymerization reaction of these groups sequentially progresses due to an electrophilic substitution reaction between the epoxy group in Formula (1) and the phenolic hydroxyl group in Formula (4). Since both compounds have functional groups present at both ends, for example, at the time of impregnation/solidification of a mixture of raw material compounds in spread reinforcement fibers at a raw material impregnation step/sheet manufacturing step and at the time of heating/press-molding of the random laminated body, an acquired polymer has a linear shape. Consequently, the polymer of the raw material compounds contained in the unidirectional prepreg and the fiber-reinforced thermoplastic resin sheet of the present invention has a thermoplastic property.

Such a polymer is excellent in handleability at the manufacturing step of the unidirectional prepreg. Specifically, the polymerization of the bisphenol A type epoxy compound and the bisphenol compound serving as raw materials sequentially progresses through the prepreg and sheet manufacturing steps. This reaction is an irreversible reaction, and no side product is eliminated as in a condensation reaction (e.g., dehydration reaction). Therefore, prepregs and sheets can be manufactured by using equipment of an open system. Additionally, since the raw material compounds used for manufacturing the prepreg have low molecular weight and low viscosity, the fibers can easily be impregnated with these raw materials even at room temperature. Furthermore, since the impregnation is easily achieved, a tension applied to the reinforcement fibers can be suppressed at the prepreg manufacturing step described later, so that the fluffing and breakage of the fibers can be prevented so as to gently process the fibers and stabilize the quality of the prepreg. If the unidirectional prepreg is manufactured by impregnation with a resin having a high molecular weight, it is difficult to sufficiently impregnate the fibers because of high viscosity of the resin and voids tend to remain within the prepreg, causing a reduction in strength in the sheet physical properties. Additionally, an amount of containable resin is limited, resulting in a lack of versatility in prepreg manufacture.

The polymer (a) which is contained in the fiber-reinforced thermoplastic resin sheet of the present invention and is acquired by a polymerization reaction of at least a bisphenol A type epoxy compound and a bisphenol compound has the proportion M in a predetermined range while maintaining the glass transition temperature of the resin itself as well as is an in-situ polymerization type thermoplastic resin and becomes an amorphous resin and thus the affinity between the reinforcement fibers and the matrix resin is favorable as well as excessive polymerization is suppressed. For this reason, it is possible to perform pressing at a low viscosity in the molding temperature region of the fiber-reinforced thermoplastic resin sheet of the present invention and to acquire a molded body exhibiting excellent surface transfer property to the mold and excellent appearance quality as well as exhibiting excellent moldability.

The fiber-reinforced thermoplastic resin sheet of the present invention may contain arbitrary additives other than those above. Examples of the additives include an organic solvent, a reaction accelerator, a coupling agent, a curative agent (reaction accelerator), a pigment, an antifoaming agent, a fungicide, a deterioration preventive agent, etc. When these additives are added, the amounts thereof may appropriately be changed depending on a purpose of addition etc. For example, a reaction accelerator may be used for accelerating the polymerization reaction of the raw material compounds. The bisphenol A type epoxy compound and the bisphenol compound serving as the raw material compounds are sequentially polymerized due to the electrophilic substitution reaction as described above. Therefore, when these compounds are polymerized, it is preferable to use a basic phosphorus-based or amine-based reaction accelerator facilitating progress of the electrophilic substitution reaction, and it is particularly preferable to use an organophosphorus compound from the viewpoint of production speed.

Example of the preferably utilized organophosphorus compound include triphenylphosphine, tri-p-tolylphosphine, diphenylcyclohexylphosphine, tricyclohexylphosphine, ethyltriphenylphosphonium bromide, benzyltriphenylphosphonium chloride, 1,4-bisdiphenylphosphinobutanone, etc.

From the viewpoint of setting the weight-average molecular weight of the polymer of the raw material compounds within the preferable range, the reaction accelerator is preferably used in an amount of 2 to 3 parts by mass based on 100 parts by mass of the polymer contained in the unidirectional prepreg.

(Reinforcement Fiber)

The fiber-reinforced thermoplastic resin sheet of the present invention is a random laminated body of a tape-shaped unidirectional prepreg and comprises spread reinforcement fibers. Examples of the reinforcement fibers include organic fibers such as aramid fibers, polyethylene fibers, and polyparaphenylene benzoxazole (PBO) fibers; inorganic fibers such as glass fibers, carbon fibers, silicon carbide fibers, alumina fibers, tyranno fibers, basalt fibers, and ceramic fibers; metal fibers such as stainless steel fibers and steel fibers; other reinforcement fibers using boron fibers, natural fibers, modified natural fibers as fibers, etc. These reinforcement fibers are preferably reinforcement fibers made up of several thousand or more filaments, and reinforcement fibers made up of 3000 to 60000 filaments are preferably used for manufacturing the unidirectional prepreg which is used for manufacturing the fiber-reinforced thermoplastic resin sheet. The reinforcement fibers are more preferably carbon fibers from the viewpoint of the strength and rigidity of the molded body prepared from the fiber-reinforced thermoplastic resin sheet of the present invention. The fiber-reinforced thermoplastic resin sheet of the present invention may contain one type of reinforcement fibers or may contain a combination of two or more types of reinforcement fibers.

In a preferred embodiment of the present invention, when the reinforcement fibers are carbon fibers, the carbon fibers may be pitch-based carbon fibers or PAN-based carbon fibers. From the viewpoint of handleability, the carbon fibers are preferably the PAN-based carbon fibers.

Although the presence or absence of twist in the reinforcement fiber is not particularly limited, the reinforcement fibers with less twist or without twist are preferable from the viewpoint of facilitating infiltration of a matrix resin. From the same viewpoint, the number of twists of the reinforcement fibers is preferably 1 twist/m or less, more preferably 0.5 twist/m or less, still more preferably 0.3 twist/m or less.

When the reinforcement fibers are carbon fibers, the carbon fibers are often wound around a bobbin that is a cylindrical tube having constant traverse width. A filament diameter of one carbon fiber is usually 5 to 8 μm, and a plurality of carbon fibers having a predetermined filament number (specifically 1000 (1K), 3000 (3K), 6000 (6K), 12000 (12K), 15000 (15K), 18000 (18K), 24000 (24K), 30000 (30K), 60000 (60K)) is bundled together into a flat shape and preferably used as a fiber bundle (carbon fiber tow). Although the filament number of the carbon fibers may appropriately be changed depending on desired width and thickness of the spread carbon fibers or the unidirectional prepreg, the number is preferably 3000 to 60000, more preferably 6000 to 24000, from the viewpoint of productivity. The filament number equal to or less than the upper limit is preferable since voids can be restrained from occurring within a prepreg to be manufactured. The filament number equal to or greater than the lower limit is preferable since fluffing due to single yarn breakage at the time of spreading and cracking of the prepreg is easily suppressed.

The fiber-reinforced thermoplastic resin sheet of the present invention is a random laminated body of tape-shaped unidirectional prepregs, and in the present specification, the random laminated body of unidirectional prepregs is a sheet-shaped material acquired by at least heating and press-molding if necessary a laminate in which chopped prepregs acquired by cutting unidirectional prepregs are laminated so that fiber directions are random. Such a laminated body is expected to be isotropic as a sheet physical property. In the present specification, the description regarding the features of the unidirectional prepreg is applied similarly as description regarding the unidirectional prepreg in a state of being contained in the fiber-reinforced thermoplastic resin sheet of the present invention.

(Unidirectional Prepreg)

The fiber-reinforced thermoplastic resin sheet of the present invention is a random laminated body of a tape-shaped unidirectional prepreg. The tape-shaped unidirectional prepreg is a prepreg containing spread reinforcement fibers, and the fibers have unidirectionality. In the prepreg contained in the fiber-reinforced thermoplastic resin sheet of the present invention, the unidirectionality of the fibers can be evaluated as follows. First, the middle point of width is determined at each of both cut end portions of the prepreg cut to have a predetermined length in the fiber direction (for example, 150 mm in the fiber direction), and the middle point of one end portion and the middle point of the other end portion are connected to define this line as a reference line. The length in the width direction (the length to be about a half of the width, hereinafter also referred to as "half width") of the prepreg on one side from the reference line is measured at least at ten positions along the fiber direction. The coefficient of variation calculated from then average value of the half width attained at least at ten positions and the standard deviation is preferably 10% or less, more preferably 9% or less, still more preferably 7% or less, and particularly preferably 5% or less.

In the present specification, the average content number of reinforcement fibers in the thickness direction, average content density of reinforcement fibers in the width direction, coefficient of variation (CV value) of width, and average length in the fiber direction regarding the unidirectional prepreg before being laminated basically do not change before and after the manufacture of the fiber-reinforced thermoplastic resin sheet from the unidirectional prepreg. For this reason, the description on the preferred ranges and the like of these regarding the unidirectional prepreg before being laminated applies similarly to the unidirectional prepreg in a state of being contained in the fiber-reinforced thermoplastic resin sheet of the present invention.

The spread reinforcement fibers contained in the fiber-reinforced thermoplastic resin sheet of the present invention are contained in each unidirectional prepreg which is randomly laminated in the fiber-reinforced thermoplastic resin sheet of the present invention. In the spread reinforcement fibers contained in each unidirectional prepreg, the average content number of reinforcement fibers in the thickness direction is preferably 20 or less, more preferably 15 or less, still more preferably 10 or less, still more preferably 8 or less, still more preferably 7 or less, and particularly preferably 6 or less. It is more preferable as the lower limit value of the average content number in the thickness direction is smaller from the viewpoint of easily enhancing the penetration of resin, and is not particularly limited, but is preferably 1 or more, more preferably 2 or more, and yet more preferably 3 or more. In a case where the average content number in the thickness direction is equal to or less than the upper limit, the compounds (bisphenol A type epoxy compound represented by Formula (1) and bisphenol compound and optionally a compound having one reactive group which is an epoxy group or a hydroxyl group in one molecule) which are raw materials for the polymer contained in the unidirectional prepreg are likely to be sufficiently uniformly impregnated into the fibers and a gap (void) which is not impregnated with the resin is less likely to be generated between the fibers. When voids are contained in the prepreg, these voids remain in the fiber-reinforced thermoplastic resin sheet (random laminated body) manufactured from the prepreg and further remain in the molded body manufactured from the sheet. As a result, sufficient strength of the molded body may not be attained. Alternatively, in order to achieve sufficient strength of the molded body, severe conditions, such as application of high temperature and/or high pressure and application of long press time, are required so that voids are removed in the process of manufacturing a random laminated body (fiber-reinforced thermoplastic resin sheet) and a molded product from the prepreg. Such severe conditions are not preferable since deterioration of the resin and a decrease in production efficiency are caused. In addition, in a case where the average content number in the thickness direction is equal to or less than the upper limit, it is easy to decrease the portions at which the fiber orientation is locally excessive, thus to transmit the stress in a direction different from the fiber axis direction via the fiber, and as a result, to fully utilize the strength inherent to the fiber.

In a case where the spread reinforcement fibers have the above configuration, the average content number and the like of reinforcement fibers in the thickness direction of each unidirectional prepreg contained in the fiber-reinforced thermoplastic resin sheet of the present invention can also be set to be equal to or less than the upper limit or equal to or more than the lower limit. For this reason, the average content number of reinforcement fibers in the thickness direction of the unidirectional prepreg contained in the fiber-reinforced thermoplastic resin sheet of the present invention is preferably 20 or less, more preferably 15 or less, still more preferably 10 or less, still more preferably 8 or less, still more preferably 7 or less, and particularly preferably 6 or less in the same manner. Moreover, it is more preferable as the lower limit value of the average content number in the thickness direction is smaller from the viewpoint of easily enhancing the penetration of resin, and is not particularly limited, but is preferably 1 or more, more preferably 2 or more, and yet more preferably 3 or more.

When the number of reinforcement fibers contained in the thickness direction in the unidirectional prepreg of the present invention is measured, a cross section acquired by cutting the prepreg in the thickness direction is embedded by a resin etc. and observed with an electron microscope etc., to count the number of fibers present in the thickness direction in the acquired image. In this way, the number of fibers present in the thickness direction is counted in cross-sectional images at least at five positions, and the average value is used as the average content number of reinforcement fibers in the thickness direction. To minimize the influence of an external force on the prepreg during cutting in the cross-sectional observation, for example, the prepreg may be cut while both surfaces thereof are sandwiched and fixed by rigid plates of metal etc., before performing the cross-sectional observation. For the measurement of at least five positions, if the unidirectional prepreg has a certain length (e.g., in the case of a tape-shaped form wound around a bobbin), the measurement may be performed at least at five positions at intervals of about 50 cm in the fiber axis direction or, if the unidirectional prepreg is in the form of a cut tape, at least five prepregs may arbitrarily be taken out from a plurality of cut prepregs for the measurement. Hereinafter, when the measurement is performed at a plurality of positions, the plurality of positions may be measured in the same way as described above.

The coefficient of variation (CV value) of the number of reinforcement fibers contained in the thickness direction in the unidirectional prepreg is preferably 20% or less, more preferably 10% or less, further preferably 5% or less. In the present invention, by measuring the number of reinforcement fibers contained in the thickness direction of the spread reinforcement fibers contained in each unidirectional prepreg at least at ten positions, the coefficient of variation is calculated from the average value and the standard deviation acquired from the results with the equation of the coefficient of variation (CV value)=standard deviation/average value×100(%). When the coefficient of variation of the number of contained reinforcement fibers in the thickness direction is not more than the upper limit, a lamination unevenness hardly occurs when the random laminated body is manufactured from the unidirectional prepregs, and the isotropy of the fiber-reinforced thermoplastic resin sheet of the present invention is easily ensured.

For the spread reinforcement fibers contained in the unidirectional prepreg, an average content density (hereinafter also referred to as an "average content density A") of the reinforcement fibers in the width direction calculated from following Eq. (3) is preferably 150 to 2,000 fibers/mm, more preferably 500 to 1,500 fibers/mm, still more preferably 700 to 1,000 fibers/mm. When the average content density of the reinforcement fibers in the width direction is not more than the upper limit, voids are hardly generated within the prepreg at the time of impregnation and subsequent solidification of the raw material compounds, and the fiber-reinforced thermoplastic resin sheet manufactured from this unidirectional prepreg is easily increased in mechanical strength. When the average content density of the reinforcement fibers in the width direction is not less than the lower limit, the prepreg is easily prevented from cracking, and the fiber-reinforced thermoplastic resin sheet of the present invention is easily increased in strength.

By setting the average content density in the width direction per unidirectional prepreg within the range, the unidirectional prepreg hardly cracks regardless of a thin layer, and voids are easily reduced. By manufacturing the fiber-reinforced thermoplastic resin sheet of the present invention by using such a unidirectional prepreg, the moldability and strength for a sheet are easily enhanced, and the molded body manufactured from the fiber-reinforced thermoplastic resin sheet of the present invention is easily improved in quality.

The average content density of the reinforcement fibers in the width direction is calculated from following Eq. (3). The method of measuring the average content number of reinforcement fibers in the thickness direction in Eq. (3) is as described above. In Eq. (3), (1/single yarn diameter [mm] of reinforcement fibers) represents the number of reinforcement fibers containable in a unit lamination layer per 1 mm in the width direction.

[Math. 2]

$$\text{Average content density [fibers/mm] of reinforcement fibers in width direction} = (\text{average content number [fibers] of reinforcement fibers in the thickness direction}) \times (1/\text{single yarn diameter [mm] of reinforcement fibers}) \quad (3)$$

The average content density A calculated from Eq. (3) will hereinafter be described. In the each prepreg contained in the fiber-reinforced thermoplastic resin sheet of the present invention, the reinforcement fibers are laminated in the thickness direction and are arranged in the width direction. The (1/single yarn diameter [mm] of reinforcement fibers) represents the number of reinforcement fibers containable in a unit lamination layer per 1 mm in the width direction, i.e., the number of reinforcement fibers containable in one layer in the thickness direction having the length of 1 mm in the width direction (in the unit lamination layer). This numerical value is a numerical value indicative of to what extent the fibers are containable in the unit lamination layer, i.e., 1 mm in the width direction x one layer in the thickness direction, and is therefore calculated by dividing 1 mm by the single yarn diameter of reinforcement fibers. As represented by Eq. (3), the average content density of the reinforcement fibers in the width direction is the product of the (1/single yarn diameter [mm] of reinforcement fibers) calculated as described above and the average content number of reinforcement fibers in the thickness direction and represents the average content number of reinforcement fibers containable per unit width (1 mm) of the prepreg. Specifically, because of being calculated by multiplying the number of reinforcement fibers containable in one layer in the thickness direction having the length of 1 mm in the width direction (in the unit lamination layer) by the average content number of reinforcement fibers in the thickness direction, the density represents the number of reinforcement fibers containable in a rectangular range having 1 mm in the width direction×a length of the thickness in the thickness direction in the cross section in the thickness direction orthogonal to the fiber direction of the prepreg.

In the unidirectional prepreg, when it is assumed that the number of reinforcement fibers contained in the unidirectional prepreg is m (fibers), that the average content number in the thickness direction is n (fibers), that the average width of the unidirectional prepreg is p (mm), and that the single yarn diameter of reinforcement fibers is q (mm), preferably, m, n, p, and q satisfy following Eq. (5):

[Math. 3]

$$0.7 \leq \frac{\{(m/n)/p\}}{(1/q)} \leq 1.3 \quad (5).$$

In the unidirectional prepreg, preferably, the reinforcement fibers arranged in the width direction are impregnated with the polymer between the fibers such that the fibers are present at certain intervals. Eq. (5) is an equation representative of the sparseness/denseness of reinforcement fibers in the width direction in the unidirectional prepreg. First, the value calculated by (m/n) in Eq. (5) is a value acquired by dividing the number (m) of reinforcement fibers contained in the unidirectional prepreg by the average content number (n) in the thickness direction and represents the number of reinforcement fibers actually contained in the range of the average width in the width direction×one layer in the thickness direction of the unidirectional prepreg. This value is further divided by the average width (p) of the unidirectional prepreg to calculate the number of reinforcement fibers actually contained in the range of 1 mm in the width direction×one layer in the thickness direction as (m/n)/p. By dividing (m/n)/p by 1/q, a parameter representative of the sparseness/denseness of reinforcement fibers in the width direction is calculated as {(m/n)/p}/(1/q) (hereinafter also referred to as "value Z"). For example, when the value Z is one, i.e., when (m/n)/p is equal to 1/q, this means that the reinforcement fibers are arranged in the width direction without a gap and, as the value Z becomes smaller than one, i.e., as (m/n)/p becomes smaller than (1/q), this means that the intervals between the reinforcement fibers arranged in the width direction becomes larger. From the viewpoint of facilitating uniform presence of the resin and fibers in the prepreg and the viewpoint of facilitating prevention of cracking of the unidirectional prepreg, the value Z is preferably 0.7 or more, more preferably 0.8 or more, still more preferably 0.9 or more. From the viewpoint of suppressing variation in strength of the fiber-reinforced thermoplastic resin sheet, the value Z is preferably 1.3 or less, more preferably 1.2 or less, still more preferably 1.1 or less.

The coefficient of variation (CV value) of width of the spread reinforcement fibers contained in the unidirectional prepreg is preferably 20% or less, more preferably 10% or less, further preferably 5% or less. In the present invention, the length of the width substantially orthogonal to the fiber direction of the spread reinforcement fibers is measured at least at ten positions to calculate the coefficient of variation from the average value and the standard deviation acquired from the results with the equation of the coefficient of variation (CV value)=standard deviation/average value×100 (%). When the spread reinforcement fibers have the configuration described above, the coefficient of variation of width in the unidirectional prepreg can preferably be set to 5% or less. When the coefficient of variation of width is not more than the upper limit, a lamination unevenness hardly occurs when the random laminated body is manufactured from the prepregs of the present invention, and the isotropy of the fiber-reinforced thermoplastic resin sheet of the present invention is easily ensured.

A fiber volume fraction (Vf) of the unidirectional prepreg is preferably 10 to 80%, more preferably 15 to 60%, further preferably 20 to 55%, still more preferably 25 to 45%, still more preferably 30 to 45%, still more preferably 35 to 45% and particularly preferably 37.5 to 42.5%. The fiber volume fraction (Vf) is measured according to JIS-7075, for example. When the fiber volume fraction is equal to or less than the upper limit, the entangling positions (non-impregnated portions) between the fibers are reduced to facilitate a voidless state. When the fiber volume fraction is equal to or more than the lower limit, the strength of the fiber-reinforced thermoplastic resin sheet and the molded body can easily be increased.

The average thickness of the unidirectional prepreg is preferably 10 to 200 µm, more preferably 20 to 180 µm, still more preferably 40 to 160 µm. When the average thickness is equal to or less than the upper limit described above, the voids can be restrained from occurring within the prepreg. When the average thickness is equal to or more than the lower limit, the prepreg can be restrained from cracking. The average thickness is an average value acquired by measuring the prepreg at least at ten positions with a thickness meter.

Considering the average content density and the thickness of the spread reinforcement fibers described above, the average width of the unidirectional prepreg is preferably 10 to 18 mm, for example, when 12K carbon fiber raw yarn is used. The average width is an average value acquired by measuring the width of the prepreg at least at ten positions by using a measuring camera etc. In the unidirectional prepreg, the width direction is a direction orthogonal to the fiber direction on the prepreg surface. In this case, setting the average width to 10 mm or more facilitates the suppression of occurrence of voids within the prepreg to be manufactured, and setting the average width to 18 mm or less facilitates the suppression of fluffing due to single yarn breakage at the time of spreading and cracking of the prepreg.

The average length in the fiber direction of the unidirectional prepreg is not particularly limited, and may be appropriately changed depending on the intended use of the unidirectional prepreg, but is preferably 10 to 50 mm and more preferably 10 to 30 mm. In a case where the average length is equal to or less than the upper limit, it is easy to suppress the generation of voids. In addition, in a case where the average length is equal to or more than the lower limit, it is easy to increase the mechanical strength of the fiber-reinforced thermoplastic resin sheet of the present invention and to decrease the variations thereof. From the viewpoint of easily increasing the mechanical strength of the fiber-reinforced thermoplastic resin sheet of the present invention, the average length in the fiber direction of the unidirectional prepreg is preferably 10 mm or more, more preferably 15 mm or more, still more preferably 20 mm or more, and particularly preferably 25 mm or more.

From the viewpoint of easily enhancing the moldability and mechanical strength of the molded body to be finally acquired, the void fraction in the unidirectional prepreg is measured in conformity with JIS-7075 in the fiber-reinforced thermoplastic sheet having an average thickness of 2 mm and is preferably 0 to 0.4 vol %.

In manufacturing of the unidirectional prepreg, a restraining agent may be applied to the spread reinforcement fibers. The adhesion of the restraining agent makes it easier to enhance the restraint of the width of the spread reinforcement fibers and can suppress cracking that may occur at the time of manufacturing the unidirectional prepreg. The adhesion amount of the restraining agent is preferably 0 to 0.8% by weight, more preferably 0.3 to 0.5% by weight, based on the weight of the reinforcement fibers in consideration of the influence on deterioration of the physical properties of the finally acquired prepreg. The adhesion amount of the restraining agent equal to or greater than the lower limit is preferable since the restraint of width of the spread reinforcement fibers is easily enhanced. Setting the adhesion amount of the restraining agent within the range can suppress deterioration of the physical properties of the molded body acquired from the prepreg and the cracking that may occur at the time of manufacturing the unidirectional prepreg. Although the type of the restraining agent used is not particularly limited, an emulsified epoxy resin, an emulsified modified polyolefin resin, etc. are preferably utilized.

<Molded Body>

The fiber-reinforced thermoplastic resin sheet of the present invention having the features exhibits excellent moldability. For this reason, the sheet has an advantage of exhibiting favorable adhesiveness to urethane resin and iron in addition to being moldable at a low pressure and being moldable into a molded body having a complicated shape. Moreover, the sheet has an advantage that the surface transfer property of a molded product is favorable.

Examples of the method for manufacturing a molded body using the fiber-reinforced thermoplastic resin sheet of the present invention include press molding. Press molding is a method for manufacturing a molded body by applying transformation such as bending, shearing, and compression to the fiber-reinforced thermoplastic resin sheet of the present invention using a processing apparatus, a mold and the like. Examples of the molding form include deep drawing, flange, coal gate, edge curling, and stamping. Examples of the press molding method include a die pressing method and an autoclave method used for molding a large-sized member (for example, an aircraft member).

The resin (polymer a) contained in the fiber-reinforced thermoplastic resin sheet of the present invention is a thermoplastic resin and thus the fiber-reinforced thermoplastic resin sheet of the present invention is also suitable for stamping molding in which the sheet is heated, transformed into the shape of the mold in a state in which the resin is melted and softened, and then cooled.

The fiber-reinforced thermoplastic resin sheet of the present invention exhibits particularly excellent moldability and can be thus used in deep drawing press molding by which it has been difficult to perform molding in the case of using conventional fiber-reinforced plastics, molding at a low pressure (4 MPa or less), and stamping molding by which it is possible to perform molding in a short time. In particular, the fiber-reinforced thermoplastic resin sheet of the present invention can also be used as a high cycle material which is required to be molded by a high cycle performed in 1 minute or less.

The present invention also provides a molded body of the fiber-reinforced thermoplastic resin sheet of the present invention. Such a molded body is manufactured, for example, by pressing the fiber-reinforced thermoplastic resin sheet of the present invention. Note that, in such a molded body, the use of the polymer molded body acquired as the polymer (a) is further polymerized by heating and the like at the time of pressing is not limited at all, but examples thereof include electrical and electronic equipment parts used in OA equipment, mobile phones and the like, building materials such as struts and reinforcing materials, automobile structural parts, and aircraft parts. The molded body of the fiber-reinforced thermoplastic resin sheet of the present invention has high strength, preferably less variations.

<Manufacturing Process>

Next, the manufacturing methods of the fiber-reinforced thermoplastic resin sheet and molded body of the present invention will be described.

(Manufacturing Method of Fiber-Reinforced Thermoplastic Resin Sheet)

The manufacturing method of a fiber-reinforced thermoplastic resin sheet of the present invention at least comprises:

(a) a step of spreading reinforcement fibers;

(b) a step of impregnating spread reinforcement fibers with a bisphenol A type epoxy compound represented by Formula (1):

[Chem. 6]

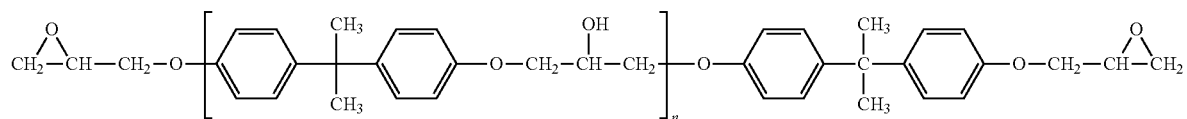

(1)

[where n is an integer of 1 to 4],
a bisphenol compound selected from the group consisting of bisphenol A, bisphenol F, bisphenol S, bisphenol B, bisphenol E, and bisphenol P, and at least one compound having one reactive group in one molecule, in which the reactive group is a hydroxyl group or an epoxy group;

(c) a step of heating the reinforcement fibers impregnated with the compounds to polymerize the compounds impregnated in the reinforcement fibers until a weight average molecular weight of an acquired polymer becomes 5,000 to 25,000 to acquire a unidirectional prepreg;

(d) a step of randomly laminating the unidirectional prepreg to acquire a laminate; and (e) a step of heating the laminate at a temperature of 100° C. to 200° C. to acquire a fiber-reinforced thermoplastic resin sheet. Note that, the manufacturing method of the present invention will be described in more detail below. In the description, a case in which the compound having one reactive group in one molecule is a compound having one epoxy group in one molecule (monofunctional epoxy compound) will be described as an example. Hence, the description to be described later also applies to a case in which a compound having one hydroxyl group in one molecule (monofunctional phenol compound) is used instead of the monofunctional epoxy compound.

The reinforcement fibers used at step (a) described above is not particularly limited and is usually unspread reinforcement fibers also referred to as "raw yarn". Such reinforcement fibers are often wound around a cylindrical bobbin with a constant traverse width and unwind before use.

If the traverse-wound raw yarn on the cylindrical bobbin is simply unwound, a fiber bundle is fed out in a meandering state relative to a movement direction. From the viewpoint of easily acquiring the fiber-reinforced thermoplastic resin sheet of the present invention described above, it is preferable to use an apparatus eliminating traverse due to the raw yarn and feeding out the fiber bundle straight in the movement direction without meandering.

An apparatus for eliminating the traverse is shown in FIG. 1. For example, it is preferable to use an apparatus including a feeding mechanism for unwinding and feeding out the raw yarn, a plurality of yarn guides 7, and a traverse guide 8 eliminating the traverse of the reinforcement fiber. A step of unwinding, for example, carbon fibers by using such an apparatus will hereinafter be described. As shown in FIG. 1, the traverse guide 8 is disposed on either one of the upper and lower sides of a preceding yarn guide 7a to perpendicularly intersect with the preceding yarn guide 7a (in FIG. 1, the traverse guide is disposed on the lower side of the thread guide 7a). In this case, the flat-shaped fiber bundle is preferably fed out such that the contact surface thereof with the guides is the same surface for all of the preceding yarn guide 7a, the traverse guide 8, and a subsequent yarn guide 7b. The feeding mechanism is exemplified by an apparatus including a raw-yarn bobbin holder 5 for setting a raw yarn 4 and a feeding tension generating motor 6. For the yarn guides 7, vertical guide rollers made of metal are preferably used. The yarn guides 7 are preferably disposed along the movement direction of the fiber bundle in substantially parallel with the raw-yarn bobbin holder 5. The diameter of the yarn guides 7 is preferably about 20 to 40 mm from the viewpoint of space saving of equipment and handling of the reinforcement fibers. The raw yarn 4 of the reinforcement fiber set in the raw-yarn bobbin holder 5 is fed out by driving the feeding tension generating motor 6 and is fed through the yarn guides 7 to step (a) for spreading the reinforcement fibers.

The fiber bundle of the raw yarn 4 is twisted by 90° when fed out from the preceding yarn guide 7a to the traverse guide 8 and then 90° when fed out from the traverse guide 8 to the subsequent yarn guide 7b and is twisted once while passing through these guides. Consequently, the traverse due to the raw yarn is eliminated, and the fiber bundle can be fed out straight in the movement direction without meandering. When the fiber bundle is fed out from the preceding yarn guide to the subsequent yarn guide, an S direction, a Z direction, or a combination thereof relative to the fiber movement direction is used as the direction of the twist.

For the traverse guide 8, a vertical guide roller made of the same metal as the yarn guides 7 may be used, or a pin guide with a small diameter may be used. Furthermore, the traverse guide may be disposed and driven in a direction opposite to the movement direction of the fiber bundle by using a drive source such as a motor or may be provided with fine unevenness on the surface of the guide. By providing the traverse guide 8 such that resistance is applied to the fiber bundle as described above, an end portion of the fiber bundle can be prevented from being folded back when the fiber bundle passes through the traverse guide 8, and the fiber bundle can be fed out while maintaining the flat state (e.g., in the case of using 12K raw yarn, the width orthogonal to the fiber direction is 5 to 8 mm or 8 to 10 mm).

The interval from the traverse guide 8 to the preceding yarn guide 7a and the subsequent yarn guide 7b is preferably 1 m or more. Consequently, the end portion can be prevented from being folded back when the fiber bundle passes through the traverse guide.

At step (a), the tension applied to the reinforcement fibers at the time of spreading is preferably 0.02 to 0.1 g/fiber, more preferably 0.04 to 0.06 g/fiber. By applying the tension in such a range, the spreadability is easily enhanced and the fluffing due to single yarn breakage is easily suppressed. If the tension is lower than 0.02 g/fiber, the fiber bundle cannot sufficiently be spread so that the average content number in the thickness direction of the spread reinforcement fibers may be too high. If the tension is higher than 0.1 g/fiber, the fluffing due to single yarn breakage may easily occur. To improve the spreadability of the reinforcement fibers, at least one of an ultrasonic spreading method, an electrostatic spreading method, a press spreading method, a jet spreading method, a ventilation type spreading method, etc. may be used.

Figure 2:
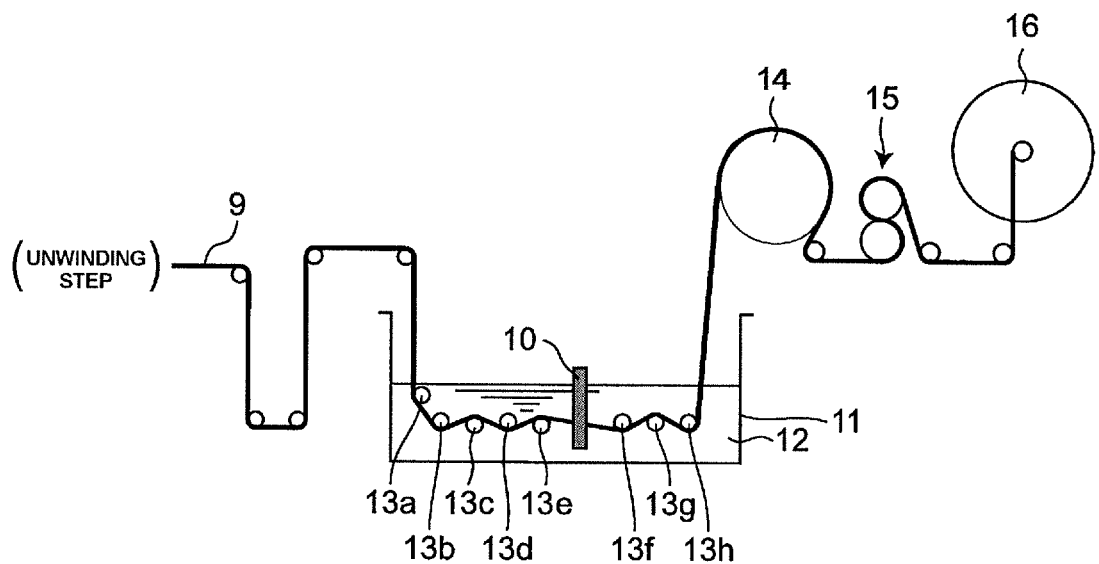
FIG. 2 is a schematic side view of an apparatus including a spreading guide, a width guide, and a spreading tank.

At step (a), the spreading may be performed by using an apparatus including a spreading guide and a width guide, for example. FIG. 2 shows an apparatus including spreading guides 13a to 13h and a width guide 10 as well as a spreading tank 11. The spreading guides 13a to 13h have a columnar shape with a predetermined diameter, for example, and are fixed at predetermined positions. The spreading guides 13a to 13h apply a load to unspread reinforcement fibers 9 in a substantially radial direction, and the reinforcement fibers are pressed in a direction vertical to the movement direction thereof. Consequently, the fiber bundle is spread and the reinforcement fibers are spread. The number of the disposed spreading guides is not particularly limited and may appropriately be changed depending on the width of the fiber bundle of the unspread reinforcement fibers 9 and the desired width of the unidirectional prepreg. A winding angle between the fiber bundle and the spreading guides 13a to 13h may appropriately be changed in the same way.

The width guide 10 is made up of a pair of guides disposed and located on the outer side than both ends of the fiber bundle and is disposed perpendicularly to the spreading guides at least at one position between the spreading guides 13a to 13h. Since the fiber bundle of the unspread reinforcement fibers 9 passes through the inside of the width guide 10, the spreading width of the fiber bundle can be adjusted, and the width accuracy of the spread reinforcement fibers can be enhanced. The number and the width of the width guides 10 to be disposed are not particularly limited and may appropriately be changed depending on the number of filaments of the reinforcement fibers, the desired width of the unidirectional prepreg, etc.

Although the material of the spreading guides 13a to 13h and the width guide 10 is not particularly limited, metal such as steel, stainless steel, and alumina is preferably used. From the viewpoint of reducing wear of fibers, it is preferable to use the guides made of stainless steel electroplated with chromium on the surface. Since the guides of such a material have a smoothed surface, wear due to contact between the guides and the fibers can be reduced during spreading, and the fluffing due to single yarn breakage can be suppressed.

The spreading tank 11 is a tank disposed for storing a spreading solution 12 containing a liquid such as water and may have the spreading guides and the width guide disposed therein so that the reinforcement fibers can be spread while being fed out in the solution. By spreading the reinforcement fibers while being immersed in the solution, a sizing agent applied at the time of manufacturing the reinforcement fibers can be removed. To increase the elution property of the sizing agent in the spreading tank, the temperature of the liquid in the spreading tank may be set to high temperature, or a surfactant etc. may be added to the liquid used. The spreading may be performed only with the spreading guide without using the spreading tank 11 depending on the type of the sizing agent applied to the raw yarn used.

A restraining agent may be applied to the spread reinforcement fibers. The adhesion of the restraining agent makes it easier to enhance the restraint of the width of the spread reinforcement fibers and can suppress cracking that may occur at the time of manufacturing the unidirectional prepreg. The restraining agent may be contained in the spreading tank described above, or a tank (resizing tank) for applying the restraining agent may be disposed separately from the spreading tank (desizing tank) for removing the sizing agent contained in the reinforcement fibers. The adhesion of the restraining agent makes it easy to suppress shrinkage in the width direction of the spread reinforcement fibers at the subsequent step (b). The adhesion amount of the restraining agent is preferably equal to or less than 0.8 mass %, more preferably 0.3 to 0.5 mass %, based on the weight of the reinforcement fibers in consideration of the influence on deterioration of the physical properties of the finally acquired prepreg. Although examples of the restraining agent are not particularly limited, an emulsified epoxy resin, an emulsified modified polyolefin resin, etc. are preferably utilized.

The reinforcement fibers spread as described above may subsequently be subjected to a step of removing moisture etc. contained in the reinforcement fibers, a step of drying (e.g., a drying roller 14 in FIG. 2), and a step of winding (e.g., a driving roller 15 and a winding part 16 in FIG. 2) as needed.

At the step of drying the spread reinforcement fibers, for example, a plurality of temperature-adjustable drying rolls may be used. By feeding out and bringing the fiber bundle into contact with the drying rolls, the fiber bundle can completely be dried. Although the temperature of the drying rolls may appropriately be changed depending on a tape width, a winding speed, the volatility of the solution in the spreading tank, etc., a temperature range of 80 to 200° C. is preferably used. The drying rolls may have the same or different temperatures.

Although step (b) may directly be conducted from step (a), if a difference in production speed exists due to equipment or between steps, a step of winding the spread reinforcement fibers may be included (e.g., a driving roller 15 and a winding part 16 in FIG. 2).

At the step of winding, a mechanism winding the spread reinforcement fibers (a winding shaft, a motor, etc.) and a reel are used. By rotating the reel attached to the winding shaft, the spread reinforcement fibers can be wound around the reel. The winding speed may appropriately be changed depending on the spreadability of the fiber bundle, the width of the spread reinforcement fibers, etc., and is preferably 50 m/min or less, more preferably 5 to 30 m/min. Winding at the speed within the range is preferable since the accuracy of the width can easily be enhanced.

At the step of winding the spread reinforcement fibers, for example, a scraper, a brush, etc. may be disposed to be in contact with a roller so as to remove the fluffing due to single yarn breakage caused by contact with each roller.

In the manufacturing method of the present invention, the reinforcement fibers unwound in the above step are spread and then impregnated with a bisphenol A type epoxy compound represented by Formula (1), a bisphenol compound, and at least one monofunctional epoxy compound. Here, the reason is not clear but the impregnating property of the matrix resin into the reinforcement fibers is favorable and the shrinkage in the width direction of the fibers after impregnation is easily suppressed in the case of the manufacturing method of the present invention in which the reinforcement fibers are impregnated with the raw material compounds as compared to a case in which the reinforcement fibers are impregnated with a bisphenol A type epoxy compound represented by Formula (1) and a bisphenol compound but are not impregnated with a monofunctional epoxy compound. It is considered that this is because inadvertent polymerization of the resin is suppressed in steps (b) and (c). As a result, it is easy to decrease the average content number of reinforcement fibers in the thickness direction per unidirectional prepreg in the fiber-reinforced thermoplastic resin sheet and also to sufficiently uniformly impregnate the matrix resin into the fibers and thus a gap (void) which is not impregnated with the resin is hardly generated between the fibers.

From the viewpoint of easily enhancing the impregnating property of the resin into between the fibers of the reinforcement fibers, it is preferable to spread the fibers until the average content number in the thickness direction becomes preferably 20 or less, more preferably 15 or less, still more preferably 10 or less, still more preferably 8 or less, still more preferably 7 or less, and particularly preferably 6 or less. Moreover, it is more preferable as the lower limit value of the average content number in the thickness direction is smaller from the viewpoint of easily enhancing the penetration of resin, and the lower limit value is not particularly limited but may be, for example, 1 or more, 2 or more in some cases, and 3 or more in other cases.

The reinforcement fibers spread through the above step have a coefficient of variation (CV) of width of preferably 20% or less, more preferably 10% or less, and still more preferably 5% or less. The method for calculating the coefficient of variation is as described above for the spread reinforcement fibers contained in the unidirectional prepreg. By setting the coefficient of variation of width to the upper limit or less, lamination unevenness hardly occurs and the isotropy of the random sheet is easily ensured when a random laminated body is manufactured from the prepreg of the present invention. According to the manufacturing method of the present invention, shrinkage in the width direction of the fibers after being impregnated with the raw material compounds is also easily suppressed, and thus the coefficient of variation of width is easily decreased.

In step (b) following above step (a), the spread reinforcement fibers are impregnated with a bisphenol A type epoxy compound represented by Formula (1):

[Chem. 7]

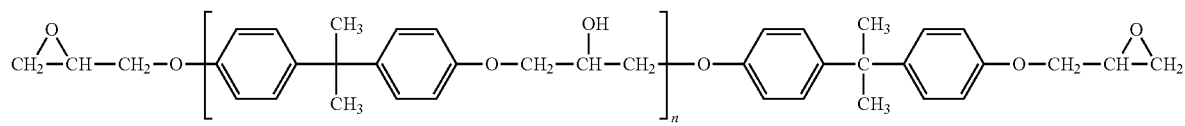

(1)

[where n is an integer of 1 to 4],
a bisphenol compound selected from the group consisting of bisphenol A, bisphenol F, bisphenol S, bisphenol B, bisphenol E, and bisphenol P, and at least one monofunctional epoxy compound. Note that, as described above, in the above description, a case in which the compound having one reactive group in one molecule is a monofunctional epoxy compound is described as an example, but a monofunctional phenol compound may be used instead of the monofunctional epoxy compound.

The molecular weights of the bisphenol A type epoxy compound, bisphenol compound, and monofunctional epoxy compound which are used as raw materials and are impregnated in step (b) are each preferably 2,000 or less. As raw materials having a low molecular weight and a low viscosity are used in this manner, the compounds to be raw materials are likely to penetrate between the spread reinforcement fibers at the time of prepreg manufacture and the acquired prepreg is in a (fully impregnated) state in which the fibers are uniformly impregnated with a thermoplastic resin, which is a polymer of these compounds but voids are not generated between the fibers. Moreover, by impregnating the fibers with the monofunctional epoxy compound, shrinkage in the width direction of the fibers tends to be suppressed as compared to a case in which the fibers are not impregnated with the monofunctional epoxy compound and thus the impregnating property into between the fibers is further improved. Note that, as described above, a monofunctional phenol compound may be used as the compound having one reactive group in one molecule, and the above description regarding the molecular weight of the monofunctional epoxy compound applies to the molecular weight of the monofunctional phenol compound as well.

The monofunctional epoxy compound impregnated in step (b) is not particularly limited, but examples thereof include aromatic monofunctional epoxy compounds (particularly alkylphenol type monofunctional epoxy compounds) and aliphatic hydrocarbon type monofunctional epoxy compounds. In step (b), one monofunctional epoxy compound may be impregnated or two or more monofunctional epoxy compounds may be impregnated in combination. Examples of such a compound include a compound represented by Formula (a):

[Chem. 8]

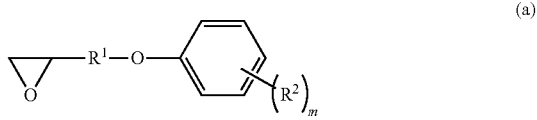

(a)

[in Formula (a),
$R^1$ denotes a single bond or a linear or branched divalent hydrocarbon group having 1 to 9 (preferably 1 to 4) carbon atoms, $R^2$ denotes a hydrogen atom or a linear or branched hydrocarbon group having 1 to 9 carbon atoms, m denotes an integer of 0 to 5 (preferably an integer of 0 to 3, more preferably 0, 1 or 2, particularly preferably 1 or 0, and most preferably 1), a plurality of $R^2$ may be the same as or different from each other when m is 2 or more]. From the viewpoint of easily enhancing the compatibility with the bisphenol A type epoxy compound and the bisphenol compound, improving the affinity of these compounds for the spread reinforcement fibers, easily achieving uniform impregnation of these compounds into the reinforcement fibers, easily performing the pressing step and the polymerization step in a state in which these compounds are uniformly dispersed, as a result, easily suppressing variations in mechanical properties and/or moldability of the fiber-reinforced thermoplastic resin sheet, $R^2$ in Formula (a) is preferably a linear or branched hydrocarbon group having 1 to 9 carbon atoms, more preferably a branched hydrocarbon group having 3 to 9 carbon atoms, and still more preferably a t-butyl group. Moreover, from the same viewpoint, it is preferable that m in Formula (a) above is 1 and $R^2$ is located at the ortho position or the para position (more preferably at the para position) with respect to the group —O—$R^1$—(CHCH$_2$O). Specific examples of such a compound include p-tert-butylphenyl glycidyl ether, glycidyl phenyl ether, glycidyl (3-methylphenyl) ether, 2-biphenyl glycidyl ether, 2-nonylphenyl glycidyl ether, 3-nonylphenyl glycidyl ether, and 4-nonylphenyl glycidyl ether.

In step (b), the bisphenol A type epoxy compound and bisphenol compound used as raw materials are preferably impregnated at a mass ratio of 50:50 to 90:10 and more preferably 60:40 to 80:20 from the viewpoint of strength, rigidity, and heat resistance of the acquired molded body. It is preferable that the proportion of the bisphenol A type epoxy compound in the mass ratio is equal to or more than the lower limit since the heat resistance of the molded body acquired from the prepreg is easily enhanced. Moreover, it is preferable that the proportion of the bisphenol A type epoxy compound in the mass ratio is equal to or less than the upper limit since it is easy to impregnate spread fibers with the bisphenol A epoxy compound and bisphenol compound in a favorably dispersed state.

The amount of the monofunctional epoxy compound impregnated in step (b) is preferably 0.1 to 8 mass % with respect to the total amount of bisphenol A type epoxy compound and bisphenol compound used as raw materials. In a case where the amount of the bisphenol A type epoxy compound is in the above range, it is easy to adjust the proportion M in the fiber-reinforced thermoplastic resin to the above range. From the viewpoint of attaining favorable moldability of the sheet, the amount of the monofunctional epoxy compound is more preferably 0.5 mass % or more, still more preferably 1 mass % or more, and particularly preferably 1 to 3 mass % with respect to the total amount of bisphenol A type epoxy compound and bisphenol compound used as raw materials. In addition, from the viewpoint of attaining sufficient mechanical strength of the fiber-reinforced thermoplastic resin sheet and molded body, the amount of the monofunctional epoxy compound is more preferably 7 mass % or less, still more preferably 6 mass % or less, and particularly preferably 5 mass % or less with respect to the total amount of bisphenol A type epoxy compound and bisphenol compound used as raw materials. Note that, as described above, a monofunctional phenol compound may be used as the compound having one reactive group in one molecule, and the above description regarding the amount of the monofunctional epoxy compound applies to the amount of the monofunctional phenol compound in step (b) as well. For example, by impregnating the compound having one reactive group in one molecule such as the monofunctional epoxy compound or the monofunctional phenol compound in the amount in the above range in step (b) and adjusting the heating temperature and heating time in the manufacturing process, the proportion ($M_{wb}/M_{wa}$) of $M_{wb}$ to $M_{wa}$ is easily adjusted to a range of 1.01 to 1.8, preferably 1.05 to 1.8, more preferably 1.05 to 1.4, and still more preferably 1.05 to 1.2.

In step (b), it is also possible to impregnate a compound having one hydroxyl group in one molecule instead of the monofunctional epoxy compound. The molecular weight of the compound having one hydroxyl group in one molecule is also preferably 2,000 or less from the viewpoint of easily enhancing the impregnating property into between the spread reinforcement fibers and easily decreasing voids between the fibers.

The compound having one hydroxyl group in one molecule impregnated in step (b) is not particularly limited, and examples thereof include a monovalent phenolic compound. One compound having one hydroxyl group in one molecule may be impregnated, or two or more compounds having one hydroxyl group in one molecule may be impregnated in combination. Examples of such a compound include an aromatic compound having one hydroxyl group in one molecule, preferably a compound represented by Formula (b):

  (b)

[where Ph denotes an aromatic hydrocarbon group which may be substituted with a linear or branched alkyl group having 1 to 10 carbon atoms]

and more preferably a compound represented by Formula (b'):

[Chem. 9]

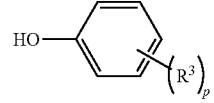  (b')

[where
$R^3$ denotes a hydrogen atom or a linear or branched hydrocarbon group having 1 to 9 carbon atoms, p denotes an integer of 0 to 5 (preferably an integer of 0 to 3, more preferably 0, 1 or 2, particularly preferably 1 or 0, and most preferably 1), a plurality of $R^3$ may be the same as or different from each other when p is 2 or more]. Note that, in the present specification, an aromatic hydrocarbon group denotes a monocyclic aromatic hydrocarbon group, a condensed polycyclic aromatic hydrocarbon group, or a ring-aggregated aromatic hydrocarbon group. The aromatic hydrocarbon group is preferably a phenyl group or a biphenyl group. From the viewpoint of easily enhancing the compatibility with the bisphenol A type epoxy compound and the bisphenol compound, improving the affinity of these compounds for the spread reinforcement fibers, easily achieving uniform impregnation of these compounds into the reinforcement fibers, easily performing the pressing step and the polymerization step in a state in which these compounds are uniformly dispersed, as a result, easily suppressing variations in mechanical properties and/or moldability of the fiber-reinforced thermoplastic resin sheet, $R^3$ in Formula (b') is preferably a linear or branched hydrocarbon group having 1 to 9 carbon atoms, more preferably a branched hydrocarbon group having 3 to 9 carbon atoms, and still more preferably a t-butyl group. Moreover, it is preferable that p in Formula (b') is 1 and $R^3$ is located at the ortho position or the para position (more preferably at the para position) with respect to —OH. Moreover, by achieving uniform impregnation as described above, an increase in molecular weight is effectively suppressed even in a case where excessive heat history is applied and the moldability is easily maintained.

Examples of such a compound include 4-phenylphenol, 2-phenylphenol, phenol, nonylphenol, 2-tert-butylphenol, 3-tert-butylphenol, and 4-tert-butylphenol.

From the viewpoint of easily enhancing the compatibility of the compound having one reactive group in one molecule impregnated in step (b) with the bisphenol A type epoxy compound and the bisphenol compound, as well as improving the affinity of these compounds for the spread reinforcement fibers, easily achieving uniform impregnation of these compounds into the reinforcement fibers, easily performing the pressing step and the polymerization step in a state in which these compounds are uniformly dispersed, as a result, easily suppressing variations in mechanical properties and/or moldability of the fiber-reinforced thermoplastic resin sheet, the compound having one reactive group in one molecule is preferably p-tert-butylphenol glycidyl ether and/or p-tert-butylphenol and more preferably p-tert-butylphenol glycidyl ether.

In step (b), arbitrary additives other than those above may be impregnated. Examples of the additives include an organic solvent, a reaction accelerator, a coupling agent, a curative agent, a pigment, an antifoaming agent, a fungicide, a deterioration preventive agent, etc. When these additives are added, the amounts thereof may appropriately be changed depending on a purpose of addition etc.

For example, a reaction accelerator may be used for accelerating the polymerization reaction of the resin. The bisphenol A type epoxy compound and the bisphenol compound serving as raw materials of the in-situ polymerization type thermoplastic resin are sequentially polymerized due to the electrophilic substitution reaction. Therefore, it is preferable to use a basic phosphorus-based/amine-based reaction accelerator facilitating progress of the electrophilic substitution reaction, and it is particularly preferable to use an organophosphorus compound from the viewpoint of production speed.

Example of the preferably utilized organophosphorus compound include triphenylphosphine, tri-p-tolylphosphine, diphenylcyclohexylphosphine, tricyclohexylphosphine, ethyltriphenylphosphonium bromide, benzyltriphenylphosphonium chloride, 1,4-bisdiphenylphosphinobutanone, etc.

From the viewpoint of easily setting the weight-average molecular weight of the polymer of the raw material compounds within the preferable range, the reaction accelerator is preferably used in an amount of 2 to 3 parts by mass based on 100 parts by mass of the polymer contained in the unidirectional prepreg. The spread reinforcement fibers are preferably impregnated with the reaction accelerator at step (b) together with the mixture containing the bisphenol A type epoxy compound and the like serving as raw materials.

With regard to a method of impregnation with the bisphenol A type epoxy compound, the bisphenol compound and the monofunctional epoxy compound serving as raw materials of the in-situ polymerization type thermoplastic resin at step (b), the spread reinforcement fibers may directly be impregnated with the raw materials or may be impregnated by using a varnish containing the raw materials and an organic solvent. From the viewpoint of enhancing the permeability to the reinforcement fibers by lowering the viscosity of the resin and facilitating the impregnation without generating voids between the reinforcement fibers, the varnish is preferably used for the impregnation. The organic solvent containable in the varnish is preferably an organic solvent having high solubility to the bisphenol A type epoxy compound, the bisphenol compound and the monofunctional epoxy compound, more preferably a polar solvent such as DNP and NMP, still more preferably a ketone-based solvent, and particularly preferably methyl ethyl ketone. The content of the organic solvent is preferably 10 to 20 parts by mass based on 100 parts by mass of the raw materials to be used from the viewpoint of the impregnating property of compounds serving as raw materials and the productivity.

The impregnation method is not particularly limited and may be performed by using a discharge die to apply the compounds serving as raw materials of the in-situ polymerization type thermoplastic resin or a solution thereof onto the upper and lower surfaces of the spread reinforcement fibers, or may be performed by immersing the spread reinforcement fibers into a solution containing the compounds serving as raw materials of the in-situ polymerization type thermoplastic resin. The reinforcement fibers impregnated with the compounds or the solution of the compounds easily shrink in the width direction due to the surface tension of the compounds or the solution. This shrinkage may cause an increase in thickness, disturbance of fiber directionality, occurrence of cracking, etc. To prevent such shrinkage, for example, a coating apparatus is preferably used at step (b).

Figure 4:
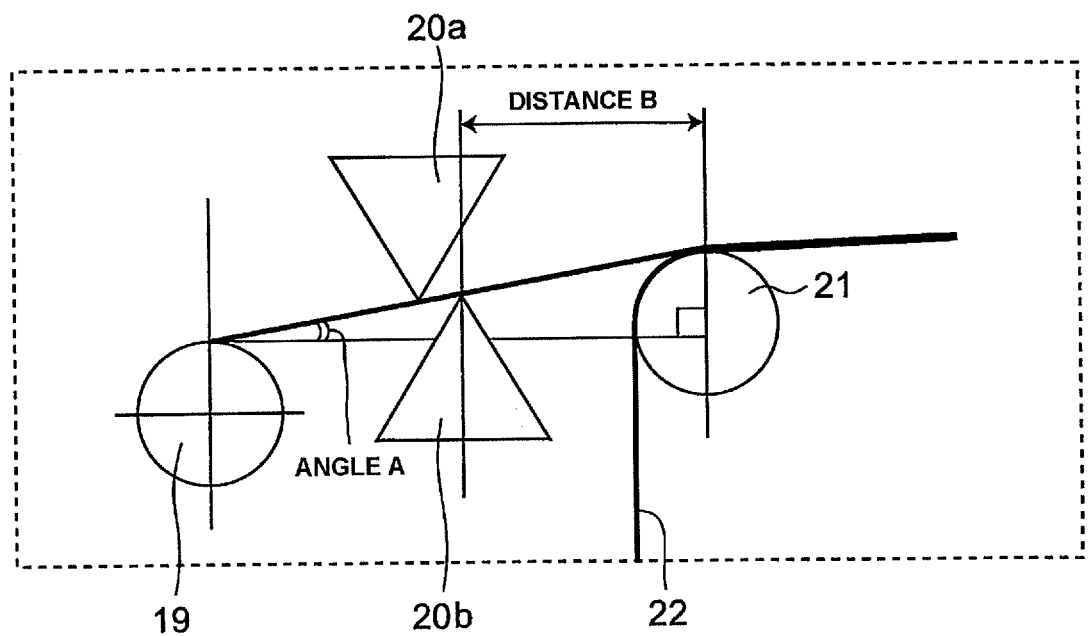
FIG. 4 is a schematic side view of a manufacturing apparatus used for impregnating the unidirectional prepregs of Examples and Comparative Examples with resin compositions.

In the case of applying a compound to be a raw material for the in-situ polymerization type thermoplastic resin or a solution thereof to the upper and lower surfaces of the spread reinforcement fibers using a discharge die, the mechanism illustrated in FIG. 4 may be used.

The mechanism illustrated in FIG. 4 includes a yarn guide roller 19 for guiding the spread reinforcement fibers, a resin discharge die 20 (die heads 20a and 20b), a conveyance belt 22 for conveying the reinforcement fibers after being impregnated, and a conveyance belt guide roller 21 (the conveyance belt guide roller 21 illustrated in FIG. 4 is also referred to as a conveyance belt guide roller 21a).

The conveyance belt guide roller 21a is disposed at a position higher than the yarn guide roller 19. The conveyance belt guide rollers 21 are disposed at positions so that the heights of the conveyance belt guide roller 21a illustrated in FIG. 4 as well, a conveyance belt guide roller 21b located between a drying furnace 23 and a cooling apparatus 24, a conveyance belt guide roller 21c located between the cooling apparatus 24 and a unidirectional prepreg tape 25 satisfy $21a > 21b > 21c$, and the reinforcement fibers after being impregnated with the raw material compounds are conveyed in a state in which the belt has the surface tension. Consequently, the shrinkage during polymerization of the bisphenol A type epoxy compound and the bisphenol compound in the subsequent solidification step can be suppressed and the solidification can be performed while maintaining the width accuracy of the spread reinforcement fibers.

The resin discharge die 20 is disposed to coat and/or impregnate the spread reinforcement fibers with the raw material compounds and is made up of a pair of die heads (20a, 20b) disposed on both sides of a conveyance path of the reinforcement fibers. Moreover, the pair of die heads (20a, 20b) of the resin discharge die is disposed at different positions with respect to the conveyance direction of the substrate. Consequently, it is possible to apply the raw material compounds to the upper and lower surfaces of the reinforcement fibers and to permeate the raw material compounds between the reinforcement fibers without generating voids. The front-rear relationship of discharge ports of the impregnation dies is not particularly limited as long as the dies are disposed at different positions with respect to the conveyance direction of the substrate. Materials of die heads and shims used in the dies are not particularly limited as long as the materials are metals, and stainless steel and the like are suitably utilized.

The reinforcement fibers impregnated with the compounds to be raw materials of the in-situ polymerization type thermoplastic resin is fed for the solidification step (to the drying furnace 23) through the conveyance belt guide rollers 21.

In a case where the spread reinforcement fibers are immersed in a solution containing the raw material compounds, after being impregnated with the raw material compounds, the reinforcement fibers are may be subjected to a squeezing step of squeezing the reinforcement fibers using rollers to remove the liquid. The squeezing pressure P applied to the rollers is preferably 0.05 MPa to 0.3 MPa and more preferably 0.1 MPa to 0.25 MPa. This enables removal of voids and control of the amount of the impregnated compounds. When the squeezing pressure is less than the lower limit, the resin adhesion amount is unstable and voids remain inside the unidirectional prepreg in some cases. In addition, when the squeezing pressure exceeds the upper limit, it is difficult to increase the resin amount in the unidirectional prepreg in some cases.

The resin impregnation amount in step (b) is preferably controlled so that the reinforcement fiber volume fraction Vf in the fiber-reinforced thermoplastic resin sheet is preferably 10 to 80%, more preferably 15 to 60%, still more preferably 20 to 55%, yet more preferably 25 to 45%, yet more preferably 30 to 45%, yet more preferably 35 to 45%, and particularly preferably 37.5 to 42.5%. It is preferable to set the volume fraction to the range described above from the viewpoint of the moldability of the fiber-reinforced thermoplastic resin sheet. In a case where the volume fraction is equal to or less than the upper limit, it is easy to suppress the generation of entangling portions (non-impregnated portions) between the fibers and to decrease voids. In a case where the volume fraction is equal to or more than the lower limit, it is easy to increase the strength of the fiber-reinforced thermoplastic resin sheet and molded body.

Subsequently, in step (c), the reinforcement fibers impregnated with the compounds are heated to solidify the raw material compounds impregnated in the reinforcement fibers. The solidification method is performed by heating. The heating temperature may be appropriately changed depending on the kind of the reinforcement fiber used, but the kind of solvent in the case of using a solution of the raw material compounds, and the like, the solidification is preferably performed in a temperature region which is higher than the glass transition temperature of the thermoplastic resin to be acquired and does not cause deactivation of the reactive groups of the raw materials and the reaction accelerator, and the heating is preferably performed in a temperature region of 100 to 200° C. The heating method is not particularly limited, but heating methods by near infrared rays, far infrared rays, and middle infrared rays are suitably used.

By this solidification, the bisphenol A type epoxy compound and the bisphenol compound are linearly polymerized together with the compound having one reactive group in one molecule such as the monofunctional epoxy compound in part, and a unidirectional prepreg containing an in-situ polymerization type thermoplastic resin having a weight average molecular weight of, for example, 5,000 to 25,000, preferably 5,000 to 20,000, more preferably 7,000 to 15,000 is acquired. In addition, in a case where a varnish containing the raw materials and an organic solvent is used for impregnation, the polymerization reaction of the bisphenol A type epoxy compound, the bisphenol compound, and the monofunctional epoxy compound proceeds as the solvent volatilizes.

Next, in step (d), the unidirectional prepreg manufactured as described above is cut to a desired fiber length and disposed so as to be randomly laminated, for example, in the mold having a desired size to acquire a laminate. As the method of random lamination, in the case of continuously manufacturing the fiber-reinforced thermoplastic resin sheet, a method in which the unidirectional prepregs cut as described above are naturally dropped from a high position and thus laminated on a conveyor such as a steel belt, a method in which air is blown into the falling path or a baffle plate is attached, and the like are suitably used. In addition, in the case of batch type manufacture, a method in which the unidirectional prepregs cut as described above are previously accumulated in a container, a conveying apparatus is attached to the lower surface of this container, and the unidirectional prepregs are dispersed in a mold and the like for sheet manufacture, and the like are suitably used.

At the step of randomly laminating the unidirectional prepregs to acquire a laminate, the unidirectional prepregs are randomly laminated in a mold having a predetermined size (e.g., 300 mm square, 600 mm square). In this case, the height of the acquired laminate is about 20 to 50 mm although differing depending on the length in the fiber direction of the unidirectional prepregs used, and it is preferable that the height is substantially uniform relative to a mold surface. Consequently, the acquired fiber-reinforced thermoplastic resin sheet has a constant number of laminated layers of the unidirectional prepregs in the thickness direction, and the mechanical strength becomes isotropic.

Subsequently, in step (e), the laminate is heated at a temperature of preferably 100 to 200° C. to acquire a fiber-reinforced thermoplastic resin sheet. By heating, the thermoplastic resin is integrated and the fiber-reinforced thermoplastic resin sheet of the present invention is acquired. Pressurization may be performed together with heating. The heating temperature at the time of manufacturing the fiber-reinforced thermoplastic resin sheet of the present invention is preferably 100 to 200° C., more preferably 150 to 180° C. If the pressurization is performed, the pressure during pressurization is preferably 0.1 to 10 MPa, more preferably 1 to 5 MPa. Specifically, for example, the heating may be performed by a method including allowing the laminate of the unidirectional prepregs laminated on a conveyor such as a steel belt to pass between hot rolls together with the steel belt for heating, pressurization, or intermittent pressing, a method including continuous heating and cooling by a belt press, a method including preheating with a far infrared heater followed by a cold press, or a batch method using a heating/cooling press. The heating temperature at the time of manufacturing the fiber-reinforced thermoplastic resin sheet of the present invention is preferably in a temperature range higher than the glass transition temperature of the in-situ polymerization type thermoplastic resin and not causing deactivation of the reactive groups of the raw materials and the reaction accelerator, and the heating is preferably performed in a temperature range of 100 to 200° C., more preferably 150 to 180° C. Consequently, the fluidity of the resin can be maintained while promoting the polymerization of the resin and gaps present between laminated prepregs can be filled by further pressurization. Consequently, voids in the acquired molded body can easily be reduced.

When the fiber-reinforced thermoplastic resin sheet of the present invention is manufactured by the manufacturing method comprising the steps (a) to (e) described above, the unidirectional prepregs containing the in-situ polymerization type thermoplastic resin used in step (b) has a relatively low weight-average molecular weight of 5,000 to 25,000, and therefore, the polymerization of the in-situ polymerization type thermoplastic resin further progresses at step (e) of heating the laminate. This polymerization occurs not only in each of the unidirectional prepregs contained in the fiber-reinforced thermoplastic resin sheet but also between the adjacent unidirectional prepregs. Consequently, the unidirectional prepregs in the fiber-reinforced thermoplastic resin sheet strongly bind to each other so that high strength is achieved. At the step of heating the laminate, the polymerization is preferably performed until the weight-average molecular weight of the acquire polymer reaches 26,000 or more.

<Molded Body>

(Manufacturing Method of Molded Body)

The fiber-reinforced thermoplastic resin sheet of the present invention exhibits high moldability, preferably has less variations in strength, and can be suitably used as an intermediate material for manufacturing various fiber-reinforced plastic molded bodies.

A method of manufacturing a molded body by using the fiber-reinforced thermoplastic resin sheet of the present invention may be press molding. Press molding is a method of manufacturing a molded body by using a processing apparatus, a mold etc. to apply deformation such as bending, shearing, compression, etc. to the fiber-reinforced thermoplastic resin sheet of the present invention. Examples of molding forms include deep drawing, flanging, corrugating, edge curling, stamping, etc.

Preferable examples of the press molding method include a heat and cool method in which a mold is heated for molding and then cooled, and a cold press (stamping) method in which molding with a low-temperature mold is performed while a sheet is heated and softened.

From the viewpoint of the fluidity of the resin, conditions at the time of manufacturing a molded body by press molding from fiber-reinforced thermoplastic resin sheet of the present invention include a press temperature that is preferably 150 to 250° C., more preferably 180 to 220° C., a press pressure that is preferably 0.1 to 10 MPa, a press time that is preferably 10 seconds to 10 minutes, more preferably 20 seconds to 5 minutes. These conditions may appropriately be changed depending on a desired thickness, a shape, etc. of the molded body.

(Molded Body)

The use of the molded body manufactured from the fiber-reinforced thermoplastic resin sheet of the present invention is not limited at all, but examples thereof include electrical and electronic equipment parts used in OA equipment, mobile phones and the like, building materials such as struts and reinforcing materials, automobile structural parts, and aircraft parts. The molded body manufactured from the fiber-reinforced thermoplastic resin sheet of the present invention has high strength with less variations. Moreover, the molded body can be utilized not only as a sheet but also as a reinforcing material serving as a unidirectional material, and the like. The fiber-reinforced thermoplastic resin sheet of the present invention has both high strength and moldability and is particularly suitable as a fiber-reinforced thermoplastic resin sheet for the manufacture of secondary structural materials for automobiles (large exterior parts such as hatchback panels and door panels, interior panels, B pillars, and the like). In addition, as a high cycle material, the fiber-reinforced thermoplastic resin sheet can cope with total cost reduction including manufacturing processes in the sports/medical fields, which has the same needs as automobile use.

For example, in the case of manufacturing a molded product having a particularly complicated shape, the fiber-reinforced thermoplastic resin sheet is required to be smoothly rolled into the complicated shape of the mold when being pressed using a mold. In addition, when a molded product is manufactured, which is required to have high strength, for example, it is conceivable to increase the content proportion of reinforcement fibers in the fiber-reinforced thermoplastic resin sheet or increase the fiber length of the reinforcement fibers, but in this case, the rollability of the sheet tends to decrease when the fiber-reinforced thermoplastic resin sheet is pressed using a mold. Furthermore, a molding method in which pressing is performed in a state in which either (for example, fiber-reinforced thermoplastic resin sheet) of the fiber-reinforced thermoplastic resin sheet or the mold is heated but the other is not heated to a high temperature is more desired as compared to a molding method in which pressing is performed in a state in which both the fiber-reinforced thermoplastic resin sheet and the mold are heated from the viewpoint of manufacturing efficiency of the molded product, but the molding method may be limited depending on the shape of the molded product. According to the fiber-reinforced thermoplastic resin sheet of the present invention in a preferred embodiment of the present invention, the above requirements can be met.

EXAMPLES

Hereinafter, the present invention will be described in more detail with reference to Examples, but the scope of the present invention is not limited thereto at all.

[Weight Average Molecular Weight, Number Average Molecular Weight, Integral Molecular Weight Distribution Curve]

The weight average molecular weight, number average molecular weight, and integral molecular weight distribution curve of the resin were measured using a gel permeation chromatography system. Specific measurement conditions are as follows.

In the measurement of the weight average molecular weight of the resin contained in prepregs 1 to 10 to be described later, the resin was extracted from each of the prepregs using tetrahydrofuran and the resin concentration in the extraction liquid was adjusted to 1 mass % to acquire a measurement sample.

In the measurement of the weight average molecular weight and number average molecular weight of the thermoplastic resin contained in fiber-reinforced thermoplastic resin sheets acquired in Examples and Comparative Examples, the thermoplastic resin was extracted from each of the fiber-reinforced thermoplastic resin sheets using tetrahydrofuran and the resin concentration in the extraction liquid was adjusted to 1 mass % to acquire a measurement sample.

(Measurement Conditions)

Column: GPC KF803L (manufactured by SHOWA DENKO K.K.)

Column temperature: 40° C.

Eluent: Tetrahydrofuran

Flow rate: 1 ml/min

Detector: SPD-M20A (manufactured by Shimadzu Corporation)

Molecular weight standard: Standard polystyrene

[Compressibility Ratio and Moldability]

The measurement conditions of the compressibility ratio of the fiber-reinforced thermoplastic resin sheet are as follows. A fiber-reinforced thermoplastic resin sheet having a circular shape, a diameter of 100 mm, and a thickness of 2 mm was used as a measurement sample. The measurement sample was extended by applying pressure using a flat mold under the following press conditions, and the compressibility ratio R [%] was calculated from the sheet thickness before pressing (t1 [mm], 2 mm in the present Example) and the sheet thickness after pressing (t2 [mm]) by the following equation. The measurement was performed at n=3, and the average value thereof was taken as the compressibility ratio.

Compressibility ratio $R=(t1-t2)/t1\times100$

It indicates that the change in sheet thickness before and after pressing is greater as the value of compressibility ratio R is greater. In this case, it can be said that the ability to follow the mold at the time of press molding tends to be favorable.

(Pressing Conditions)

Resin sheet heating temperature: 220° C.

Mold temperature: 110° C.

Initial pressure: 20 MPa
Clamping time at 110° C.: 1 minute
Demolding temperature: 80° C.
(Moldability)
The moldability was evaluated according to the following criteria based on the compressibility ratio.
⊙: Compressibility ratio is 40% or more
○: Compressibility ratio is 30% or more and less than 40%
Δ: Compressibility ratio is 23% or more and less than 30%
×: Compressibility ratio is less than 23%
[Average Bending Strength and Strength]
The average bending strength was measured in conformity with ASTM D790 using Universal Testing Machine (100 kN Tensilon) manufactured by Shimadzu Corporation. As the measurement sample, a large number of test pieces cut from the fiber-reinforced thermoplastic resin sheets acquired in Examples and Comparative Examples to have a length of 80 mm, a width of 35 mm, and a thickness of 2 mm were prepared, and 10 pieces were picked out from the test pieces and used. The average value was calculated from the results attained by 10 times of measurement.
(Strength)
The strength was evaluated according to the following criteria based on the average bending strength.
⊙: Average bending strength is 440 MPa or more
○: Average bending strength is 350 MPa or more and less than 440 MPa
ΔC: Average bending strength is 250 MPa or more and less than 350 MPa
×: Average bending strength is less than 250 MPa
[Complex Viscosity]
The complex viscosity of the fiber-reinforced thermoplastic resin sheet at 180° C. was measured at the same strain and frequency under the following conditions using a rotary viscometer. The complex viscosity at the start of measurement is taken as the complex viscosity of the resin sheet at 180° C. In addition, the measurement was performed for 1 hour, and the time course of complex viscosity was examined. Note that, in the present Examples and Comparative Examples, the viscosity at the start of measurement was the lowest and the viscosity tended to increase during the measurement for 1 hour. Hence, the upper and lower limits of each complex viscosity range in Table 6 denote the maximum and minimum values in the complex viscosity measurement for 1 hour and the minimum value is the complex viscosity of the fiber-reinforced thermoplastic resin sheet at 180° C.
(Measurement Conditions)
Strain: 3%
Frequency: 1 Hz
Measurement temperature: 180° C.
Specification jig: DD25 parallel plate
[Manufacture of Resin Compositions 1 to 7]
By preparing and homogeneously mixing 1,000 g (containing 550 g of bisphenol A type epoxy compound which was represented by Formula (1) and had a weight average molecular weight of 200 to 1,000, 300 g of bisphenol A, and 150 g of methyl ethyl ketone) of XNR6850 manufactured by Nagase ChemteX Corporation, 80 g (containing 27 g of methyl ethyl ketone, 27 g of ethyl acetate, and 24 g of organophosphorous compound) of reaction accelerator (XNH6850), and p-tert-butylphenylglycidyl ether (monofunctional epoxy compound) in an amount so that the proportion [mass %] of the amount of the monofunctional epoxy compound with respect to the total amount of the bisphenol A type epoxy compound and the bisphenol compound was 0%, 0.1%, 0.5%, 1%, 3%, 5%, and 10% by using a stirrer to acquire resin compositions 1 to 7. The viscosity of the acquired resin compositions was 100 to 200 mPa·s as measured using a rotary viscometer. The proportion [mass %] of the amount of the monofunctional epoxy compound with respect to the total amount of the bisphenol A type epoxy compound and the bisphenol compound in each of the resin compositions was as presented in Table 1.

TABLE 1

| Resin composition | Amount of monofunctional epoxy compound [mass %] |
|---|---|
| 1 | 0.1 |
| 2 | 0.5 |
| 3 | 1 |
| 4 | 3 |
| 5 | 5 |
| 6 | 0 |
| 7 | 10 |

[Manufacture of Resin Compositions 8 to 10]
Resin compositions 8 to 10 in which the proportion [mass %] of the amount of the monofunctional phenol compound with respect to the total amount of the bisphenol A type epoxy compound and the bisphenol compound was respectively 1%, 3%, and 5% were manufactured in the same manner as the resin compositions 3 to 5 except that 2-tert-butylphenol (monofunctional phenol compound) was used instead of the monofunctional epoxy compound.
[Method of Spreading Reinforcement Fibers]
The apparatus for spreading the reinforcement fibers included a mechanism for feeding out raw yarns, a mechanism for winding the spread reinforcement fibers, a guide through which carbon fibers passed, a spreading tank for spreading reinforcement fibers, and a control mechanism for controlling the feeding or winding speed. Note that, the mechanism for feeding out raw yarns had an apparatus for eliminating the traverse. A fiber bundle was threaded at a winding speed of 20 m/min and, after the fiber bundle was unwound under the condition of the tension of 0.04 to 0.06 g/fiber, the fiber was spread by pressurizing the fiber bundle in a state of being immersed in the solution in the spreading tank, and the moisture was removed to acquire spread reinforcement fibers (hereinafter also referred to as "spread tape"). Note that, in the respective Examples and Comparative Examples, the guide width was adjusted so that a desired average width was attained. The filament number, the average width, and the coefficient of variation of the average width of the spread reinforcement fibers used in the respective Examples and Comparative Examples and the average content number of reinforcement fibers in the thickness direction are as presented in each Example and Table 2 and Table 7. The average width of spread reinforcement fibers and the coefficient of variation thereof were attained by measuring the width using a camera.
[Manufacturing Method of Prepreg]
A unidirectional prepreg to be used in the manufacture of a fiber-reinforced thermoplastic resin sheet was manufactured using a manufacturing apparatus of which the schematic view was illustrated in FIG. 3. The manufacturing apparatus included a winding package 17 of spread reinforcement fibers, the yarn guide roller 19, the resin discharge die 20, the conveyance belt guide roller 21, the conveyance belt 22, the drying furnace (polymerization furnace) 23, and the cooling apparatus 24. Moreover, in order to describe the apparatus related to the step of impregnating the spread reinforcement fibers with a resin in more detail, the details of a portion of the manufacturing apparatus illustrated in FIG. 3 are illustrated in FIG. 4.

Figure 3:
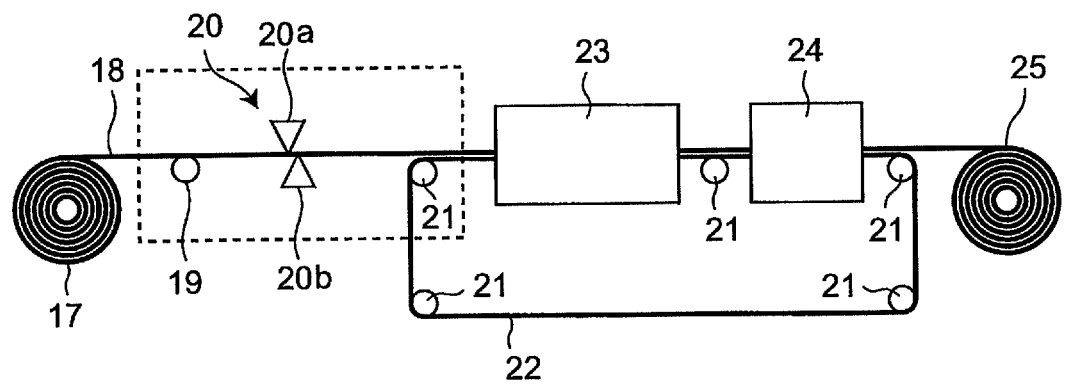
FIG. 3 is a schematic side view of a manufacturing apparatus used for manufacturing unidirectional prepregs of Examples and Comparative Examples.

Note that, in FIG. 3, the spread reinforcement fibers come into contact with the yarn guide roller 19 at the same height as the height at which the reinforcement fibers after being impregnated with the resin come into contact with the conveyance belt 22, but actually, the distance B between the center of the conveyance belt guide roller 21 and the lower surface die head 20b illustrated in FIG. 4 was set to 20 mm and the angle A was set to 1 degree.

[Manufacturing Method of Fiber-Reinforced Thermoplastic Resin Sheet]

The tape-shaped prepreg acquired according to the manufacturing method of a prepreg was cut so that the length in the fiber direction was a predetermined length (26 mm in the present Example). The unidirectional prepregs acquired in this manner were spread in a circular mold having a diameter of 100 mm so that the fiber directions were scattered, and the mold was then heated at 180° C. for 10 minutes without pressurization to polymerize the resin contained in the unidirectional prepregs. Subsequently, pressurization was performed at 4 MPa for 20 minutes while maintaining the temperature at 180° C., the temperature was then lowered to 80° C. or less, and demolding was performed. In this manner, a fiber-reinforced thermoplastic resin sheet having a circular shape, a diameter of 100 mm, and an average thickness of 2 mm was manufactured. Moreover, the heat-treated thermoplastic resin sheet for measurement of the proportion M was manufactured by placing the fiber-reinforced thermoplastic resin sheet acquired as described above in an oven set to 180° C. and performing a heat treatment of the resin sheet for 1 hour.

[Manufacturing Example: Manufacture of Unidirectional Prepregs 1 to 7]

Raw yarns (a) to (g) of carbon fiber having a single yarn diameter of 7 μm and a filament number of 15 k were spread according to the method of spreading reinforcement fibers. The spread carbon fibers (hereinafter also referred to as "spread tapes 1 to 7") each had the average width, the coefficient of variation of width, and the average content number of reinforcement fibers in the thickness direction presented in Table 2. Next, the spread tapes 1 to 7 were threaded at a predetermined speed (10 m/min), and the resin compositions 1 to 7 were discharged from the resin discharge die (impregnation die) to impregnate the tapes. The resin-impregnated tapes after impregnation were received by the conveyance belt and passed through the dry polymerization furnace set to 200° C. over 1 minute to manufacture tape-shaped unidirectional prepregs 1 to 7. The length of the manufactured tape was 2000 m. In the above step, the tension applied to the tape was 300 g. The average thickness and average width of the acquired unidirectional prepreg were as presented in Table 2. Moreover, the fiber volume fraction (Vf) was 40% (adhesion amount accuracy: ±2%).

TABLE 2

| | | Spread tapes 1 to 7 | | | | Unidirectional prepregs 1 to 7 | | |
|---|---|---|---|---|---|---|---|---|
| Prepreg | Raw yarn | Average width [mm] | Coefficient of variation of width | Average content number of reinforcement fibers in thickness direction [fibers] | Resin composition | Average thickness [mm] | Average width [mm] | Coefficient of variation of width |
| 1 | a | 20.3 | 2.2 | 5.2 | 1 | 0.091 | 15.8 | 10.5 |
| 2 | b | 20.2 | 2.9 | 5.2 | 2 | 0.087 | 16.5 | 6.2 |
| 3 | c | 20.5 | 3.9 | 5.1 | 3 | 0.082 | 17.5 | 9.0 |
| 4 | d | 19.4 | 2.7 | 5.4 | 4 | 0.089 | 1G.1 | 9.0 |
| 5 | e | 19.4 | 2.7 | 5.4 | 5 | 0.088 | 16.3 | 8.0 |
| 6 | f | 20.4 | 2.4 | 5.1 | 6 | 0.087 | 16.5 | 7.6 |
| 7 | g | 19.7 | 2.1 | 5.3 | 7 | 0.084 | 17.1 | 7.0 |

The unidirectional prepregs 1 to 7 acquired as described above were subjected to the measurement of weight average molecular weight (Mw) of the polymer contained in the unidirectional prepreg, average content number of reinforcement fibers in the thickness direction of the unidirectional prepreg, average content density of the reinforcement fibers in the width direction, average thickness thereof, average width thereof, and coefficient of variation of width according to the measurement methods described above or below. Moreover, the adherability of resin was evaluated according to the following evaluation method. The attained results are presented in Table 3.

The average content number of reinforcement fibers in the thickness direction of the unidirectional prepreg was measured by cutting the acquired unidirectional prepreg in the thickness direction and observing the cross section thereof magnified 100 to 1000 times under an electron microscope to count the number of fibers present in the thickness direction in the attained image. The measurement was performed at least at five positions, and the average value thereof was taken as the average content number of reinforcement fibers in the thickness direction.

The average content density of reinforcement fibers in the width direction of the unidirectional prepreg was calculated from the average content number of reinforcement fibers in the thickness direction measured as described above and the single yarn diameter of the carbon fibers used in each of Examples and Comparative Examples according to Equation (3) above.

The average thickness was attained by measuring the thickness of the unidirectional prepreg every 1 m using a thickness meter and calculating the average value thereof.

The average width was attained by measuring the width of the unidirectional prepreg at least every 50 cm with respect to the fiber direction using a camera and calculating the average value thereof.

The fiber volume fraction was measured from the mass of the prepreg per 1 m, and the fiber volume fraction was 40% in all Examples and Comparative Examples. Moreover, the adhesion amount accuracy was ±2% in all Examples and Comparative Examples.

The resin adherability was evaluated according to the following criteria based on the presence or absence of the fiber-exposing portion (friction) on both surfaces of the acquired unidirectional prepreg.

Criteria for evaluation on resin adherability
A: fiber-exposing portion is not present at all
B: fiber-exposing portion is almost not present
C: number of fiber-exposing portions are slightly large
D: number of fiber-exposing portions are extremely large

TABLE 3

| Prepreg | Content of monofunctional epoxy compound [%] | $M_w$ | Average content number of reinforcement fibers in thickness direction | Average content density of reinforcement fibers in width direction | Resin adherability |
|---|---|---|---|---|---|
| 1 | 0.1 | 17,174 | 6.4 | 909 | B |
| 2 | 0.5 | 23,388 | 6 | 857 | B |
| 3 | 1 | 21,484 | 6.5 | 931 | A |
| 4 | 3 | 19,912 | 6.4 | 920 | A |
| 5 | 5 | 16,148 | 5.1 | 912 | A |
| 6 | 0 | 22,295 | 6.6 | 949 | B |
| 7 | 10 | 13,027 | 5.3 | 881 | A |

Examples 1 to 4 and Comparative Examples 1 and 2

The tape-shaped unidirectional prepregs 2 to 7 acquired as described above were each cut so that the length in the fiber direction was 26 mm, and fiber-reinforced thermoplastic resin sheets were manufactured according to the method described in the manufacturing method of a fiber-reinforced thermoplastic resin sheet. The evaluation results of the resin sheets are presented in Tables 4 to 6. Note that, the sheet of Example 3 was not subjected to the evaluation on the compressibility ratio and strength, but the sheet of Example 3 is considered to have physical properties located between the fiber-reinforced thermoplastic resin sheets of Examples 2 and 4 and thus to exhibit favorable moldability and strength in the same manner as the fiber-reinforced thermoplastic resin sheets of Examples 2 and 4. In addition, the fiber-reinforced thermoplastic resin sheet of Example 4 exhibited relatively favorable moldability and strength but was slightly inferior to the sheets of Examples 1 to 3 in terms of handleability since sagging was observed on the sheet in a heated state. Note that, the complex viscosity of the fiber-reinforced thermoplastic resin sheet of Example 4 is not described in Table 6 but is considered to be about several hundreds [Pa·s].

Reference Example 1

A fiber-reinforced thermoplastic resin sheet was manufactured in the same manner as the above using the tape-shaped unidirectional prepreg 1 acquired as described above. The evaluation results of the resin sheet are presented in Tables 4 to 5. Note that, in the fiber-reinforced thermoplastic resin sheet of Reference Example 1, Xa was 84, Xb was 81, the value X was 1.14, and Ya was 27.

TABLE 4

| | | Prepreg | Weight average molecular weight | | | Number average molecular weight | | Molecular weight distribution | | Rate of change |
| | | | $M_{wa}$ | $M_{wb}$ | $M_{wb}/M_{wa}$ (proportion M) | $M_{na}$ | $M_{nb}$ | $M_{wa}/M_{na}$ | $M_{wb}/M_{nb}$ | |
|---|---|---|---|---|---|---|---|---|---|---|
| Example | 1 | 2 | 130863 | 179575 | 1.37 | 16113 | 17339 | 8.12 | 10.35 | 1.27 |
| | 2 | 3 | 68292 | 89012 | 1.30 | 10819 | 11560 | 6.31 | 7.70 | 1.22 |
| | 3 | 4 | 74672 | 92199 | 1.23 | 13477 | 14031 | 5.54 | 6.57 | 1.19 |
| | 4 | 5 | 29963 | 32712 | 1.09 | 8724 | 9064 | 3.43 | 3.60 | 1.05 |

TABLE 4-continued

| | | Weight average molecular weight | | | $M_{wb}/M_{wa}$ (proportion M) | Number average molecular weight | | Molecular weight distribution | | Rate of change |
|---|---|---|---|---|---|---|---|---|---|---|
| | Prepreg | $M_{wa}$ | $M_{wb}$ | | | $M_{na}$ | $M_{nb}$ | $M_{wa}/M_{na}$ | $M_{wb}/M_{nb}$ | |
| Comparative Example | 1 | 6 | 47981 | 99042 | 2.06 | 10347 | 12168 | 4.63 | 8.13 | 1.76 |
| | 2 | 7 | 23384 | 23605 | 1.01 | 9012 | 9168 | 2.59 | 2.57 | 0.99 |
| Reference Example 1 | | 1 | 85336 | 97753 | 1.15 | 14367 | 13080 | 5.93 | 7.47 | 1.26 |

TABLE 5

| | | Number of layers of unidirectional prepregs per unit thickness of sheet [layers/mm] | Void fraction [%] |
|---|---|---|---|
| Example | 1 | 12.5 | 0.4 |
| | 2 | 11.7 | 0.2 |
| | 3 | 11.8 | 0.3 |
| | 4 | 11.6 | 0.3 |
| Comparative Example | 1 | 11.1 | 0.6 |
| | 2 | 12.4 | 0.7 |
| Reference Example 1 | | 12.1 | 0.2 | presented in Table 7. Next, the spread tapes 8 to 10 were threaded at a predetermined speed (10 m/min), and the resin compositions 8 to 10 were discharged from the resin discharge die (impregnation die) to impregnate the tapes. The resin-impregnated tapes after impregnation were received by the conveyance belt and passed through the dry polymerization furnace set to 200° C. over 1 minute to manufacture tape-shaped unidirectional prepregs 8 to 10. The length of the manufactured tape was 2000 m. In the above step, the tension applied to the tape was 300 g. The average thickness and average width of the acquired unidirectional prepreg were as presented in Table 8. Moreover, the fiber volume fraction (Vf) was 40% (adhesion amount accuracy: ±2%).

TABLE 6

| | Prepreg | Xa | Xb | Value X | Ya | Viscosity [Pa·s] | Compressibility ratio [%] | Moldability | Bending strength [MPa] | Strength | Product of compressibility ratio and bending strength |
|---|---|---|---|---|---|---|---|---|---|---|---|
| Example | 1 | 2 | 78 | 75 | 1.11 | 22 | 10,300~11,500 | 24.8 | Δ | 542 | ⊙ | 13442 |
| | 2 | 3 | 87 | 84 | 1.19 | 35 | — | 37.8 | ○ | 480 | ⊙ | 18144 |
| | 3 | 4 | 86 | 84 | 1.13 | 25 | 2,330~2,430 | — | — | — | — | — |
| | 4 | 5 | 95 | 94 | 1.24 | 40 | — | 45.0 | ⊙ | 446 | ⊙ | 20070 |
| Comparative Example | 1 | 6 | 90 | 83 | 1.71 | 34 | 14,700~16,500 | 22.5 | X | 509 | ⊙ | 11453 |
| | 2 | 7 | 98 | 98 | 1.00 | 45 | — | 51.6 | ⊙ | 253 | X | 13055 |

[Manufacturing Example: Manufacture of Unidirectional Prepregs 8 to 10]

Raw yarns (h) to (j) of carbon fiber having a single yarn diameter of 7 μm and a filament number of 15 k were spread according to the method of spreading reinforcement fibers. The spread carbon fibers (hereinafter also referred to as "spread tapes 8 to 10") each had the average width, the coefficient of variation of width, and the average content number of reinforcement fibers in the thickness direction Examples 5 to 7

The tape-shaped unidirectional prepregs 8 to 10 acquired as described above were each cut so that the length in the fiber direction was 26 mm, and fiber-reinforced thermoplastic resin sheets were manufactured according to the method described in the manufacturing method of a fiber-reinforced thermoplastic resin sheet. The evaluation results of the resin sheets are presented in Tables 7 to 11.

TABLE 7

| | | Spread tapes 8 to 10 | | | | Unidirectional prepregs 8 to 10 | | |
|---|---|---|---|---|---|---|---|---|
| Prepreg | Raw yarn | Average width [mm] | Coefficient of variation of width | Average content number of reinforcement fibers in thickness direction [fibers] | Resin composition | Average thickness [mm] | Average width [mm] | Coefficient of variation of width |
| 8 | h | 19.3 | 2.4 | 5.4 | 8 | 0.084 | 17.1 | 7.3 |
| 9 | i | 20.1 | 2.0 | 5.1 | 9 | 0.084 | 17.2 | 8.1 |
| 10 | j | 19.8 | 2.2 | 5.3 | 10 | 0.081 | 17.8 | 8.0 |

TABLE 8

| Prepreg | Content of monofunctional epoxy compound [%] | $M_w$ | Average content number of reinforcement fibers in thickness direction | Average content density of reinforcement fibers in width direction | Resin adherability |
|---|---|---|---|---|---|
| 8 | 1 | 19053 | 6.2 | 925 | A |
| 9 | 3 | 18196 | 6.2 | 910 | A |
| 10 | 5 | 17041 | 6.0 | 903 | A |

TABLE 9

| | | Weight average molecular weight | | | Number average molecular weight | | Molecular weight distribution | | Rate of change |
|---|---|---|---|---|---|---|---|---|---|
| | Prepreg | $M_{wa}$ | $M_{wb}$ | $M_{wb}/M_{wa}$ (proportion M) | $M_{na}$ | $M_{nb}$ | $M_{wa}/M_{na}$ | $M_{wb}/M_{nb}$ | |
| Example 5 | 8 | 67,838 | 78395 | 1.16 | 16533 | 17374 | 4.10 | 4.51 | 1.10 |
| 6 | 9 | 46,832 | 49451 | 1.06 | 13691 | 14020 | 3.42 | 3.53 | 1.03 |
| 7 | 10 | 34,010 | 34207 | 1.01 | 11462 | 11276 | 2.97 | 3.03 | 1.02 |

TABLE 10

| | Number of layers of unidirectional prepregs per unit thickness of sheet [layers/mm] | Void fraction [%] |
|---|---|---|
| Example 5 | 12.0 | 0.4 |
| 6 | 12.1 | 0.1 |
| 7 | 12.5 | 0.3 |

TABLE 11

| | Prepreg | Xa | Xb | Value X | Ya | Viscosity [Pa·s] | Compressibility ratio [%] | Moldability | Bending strength [MPa] | Strength | Product of compressibility ratio and bending strength |
|---|---|---|---|---|---|---|---|---|---|---|---|
| Example 5 | 8 | 81 | 78 | 1.16 | 19 | 2000~2100 | 38.0 | ○ | 473 | ⊙ | 17974 |
| 6 | 9 | 89 | 88 | 1.09 | 24 | 1450~1600 | 41.2 | ⊙ | 460 | ⊙ | 18952 |
| 7 | 10 | 95 | 95 | 1.00 | 29 | 950~1050 | 45.8 | ⊙ | 451 | ⊙ | 20656 |

<Moldability Rest: Stamping Molding>

Figure 5:
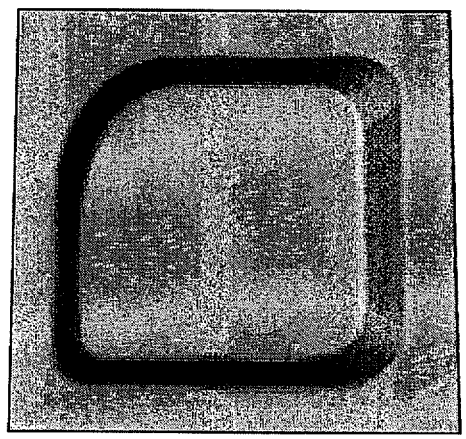
FIG. 5 is a view of a mold used in Examples.

A fiber-reinforced thermoplastic resin sheet having a size of 400 mm square and a thickness of 2.8 mm was acquired in the same manner as in Example 4. The fiber-reinforced thermoplastic resin sheet was a sheet having the same features as those of the fiber-reinforced thermoplastic resin sheet of Example 4. The fiber-reinforced thermoplastic resin sheet was preheated at 230° C., conveyed to a mold heated to 70° C., and pressed at a press pressure of 13 MPa for 120 seconds. The pressing was followed by demolding from the mold to acquire a molded product. As the mold, a box mold composed of a top surface, a slope surface, and a flange surface as illustrated in FIG. 5 was used. The mold illustrated in FIG. 5 had a total volume of 377.23 cm³, a top surface volume of 103 cm³, a slope surface volume of 158.03 cm³, and a flange surface volume of 116.2 cm³. Moreover, the standing angle of the slope surface with respect to the flange surface or the top surface was 19 degrees or 42 degrees. As a result of the stamping molding, a molded body exhibiting favorable surface transfer property was acquired, and the mechanical strength of the molded body was also sufficiently high.

Stamping molding was performed under the same conditions using a fiber-reinforced thermoplastic resin sheet acquired in the same manner as in Comparative Example 2 instead of the fiber-reinforced thermoplastic resin sheet acquired in the same manner as in Example 4. As a result, the acquired molded body had insufficient mechanical strength, a number of sink marks were observed on the surface portion, and an incompletely filled portion was generated on the flange surface due to poor flow, resulting in poor quality.

As is apparent from the results in Tables 4 and 6 and Tables 9 and 11, the fiber-reinforced thermoplastic resin sheet of the present invention in which $M_{wa}$ was 25,000 or more and the proportion M was in a predetermined range had a high compressibility ratio and excellent moldability and the strength of the resin sheet itself was also high. On the other hand, it was confirmed that the fiber-reinforced thermoplastic resin sheets of Comparative Examples 1 and 2 had a low compressibility ratio and did not exhibit sufficient moldability or had low strength. Moreover, the fiber-reinforced thermoplastic resin sheets of Examples 1 to 7 are considered to provide molded bodies exhibiting favorable surface transfer property and excellent appearance quality from the complex viscosity and compressibility ratio. In particular, among Examples 1 to 7, in the case of the fiber-reinforced thermoplastic resin sheets of Examples 1 to 4, the affinity between the reinforcement fibers and the matrix resin is extremely favorable, the ability to follow the mold shape is favorable, and the appearance quality of the molded body is more favorable. In the case of the fiber-reinforced thermoplastic resin sheet of Example 7, favorable results were attained in the compressibility ratio and strength but the affinity between the reinforcement fibers and the matrix resin was slightly inferior as compared to that in Examples 1 to 6. For this reason, in a case where a molded body is manufactured using the sheet of Example 7, it is considered that the appearance quality of the molded body to be acquired is slightly inferior although it is more favorable than that of the molded body manufactured using the sheet of Comparative Example 2. Stamping molding of the sheet of Example 4 was possible at a significantly low pressure of 13 MPa even when using a mold which had a shape with raised slope surfaces and was thus usually required to be pressed at a high pressure and heated at a high temperature when being used in molding. According to the fiber-reinforced thermoplastic resin sheet of the present invention, as is apparent from the results of the moldability test, even in a case where excessive heat history is continuously added to the sheet in the preheating step, an excessive increase in molecular weight can be suppressed, pressing in a low-viscosity state is possible, and high moldability can be achieved. Consequently, the fiber-reinforced thermoplastic resin sheet of the present invention is highly versatile and can be expected to be utilized as a high cycle material which is required to be molded in a short time. More specifically, it means that a 1 m² sheet can be molded in 1 minute using a 2,000-ton press that exists in large quantities in Japan, thus high cycle molding that has not been possible with conventional CFRP, and the molding cost is greatly reduced.

EXPLANATIONS OF LETTERS OR NUMERALS 4 raw yarn
5 raw-yarn bobbin holder
6 feeding tension generating motor
7 yarn guide
7a preceding yarn guide
7b subsequent yarn guide
8 traverse guide
9 unspread reinforcement fibers
10 width guide
11 spreading tank
12 spreading solution
13a to 13h spreading guide
14 drying roller
15 driving roller
16 winding part
17 winding package of spread reinforcement fibers
18 spread reinforcement fibers
19 yarn guide roller
20 resin discharge die
20a upper-surface die head
20b lower-surface die head
21 conveyance belt guide roller
22 conveyance belt
23 drying furnace
24 cooling apparatus
25 unidirectional prepreg tape

What is claimed is:
1. A fiber-reinforced thermoplastic resin sheet which is a random laminated body of a tape-shaped unidirectional prepreg, the fiber-reinforced thermoplastic resin sheet comprising spread reinforcement fibers and a polymer (a), wherein the polymer (a) is a polymer of at least a bisphenol A type epoxy compound represented by Formula (1):

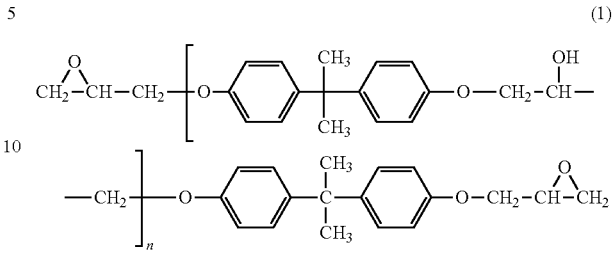

where n is an integer of 1 to 4
and a bisphenol compound selected from the group consisting of bisphenol A, bisphenol F, bisphenol S, bisphenol B, bisphenol E, and bisphenol P,
$M_{wa}$ is 25,000 or more and a proportion ($M_{wb}/M_{wa}$) of $M_{wb}$ to $M_{wa}$ is 1.05 to 1.8, where $M_{wa}$ denotes a weight average molecular weight of the polymer (a) and $M_{wb}$ denotes a weight average molecular weight of a polymer (b) contained in a heat-treated fiber-reinforced thermoplastic resin sheet acquired by heating the fiber-reinforced thermoplastic resin sheet at 180° C. for 1 hour, and
a complex viscosity of the fiber-reinforced thermoplastic resin sheet at 180° C. measured at a frequency of 1 Hz and a strain of 3% is 500 to 13,000 Pa·s.

2. The fiber-reinforced thermoplastic resin sheet according to claim 1, wherein the weight average molecular weight $M_{wa}$ of the polymer (a) is 26,000 to 140,000.

3. The fiber-reinforced thermoplastic resin sheet according to claim 1, wherein a number average molecular weight $M_{na}$ of the polymer (a) is 8,000 to 20,000.

4. The fiber-reinforced thermoplastic resin sheet according to claim 1, wherein a molecular weight distribution $M_{wa}/M_{na}$, which is a ratio of the weight average molecular weight $M_{wa}$ to a number average molecular weight $M_{na}$ of the polymer (a), is 3 to 10.

5. The fiber-reinforced thermoplastic resin sheet according to claim 1, wherein Xa and Xb satisfy Formula (2):

$$1.5 \leq (100-Xb)(100-Xa) \geq 1.0 \quad (2)$$

where Xa denotes a proportion (%) of a component having a molecular weight of 100,000 or less in an integral molecular weight distribution curve of the polymer (a) by gel permeation chromatography (GPC) method and Xb denotes a proportion (%) of a component having a molecular weight of 100,000 or less in an integral molecular weight distribution curve of the polymer (b) by GPC method.

6. The fiber-reinforced thermoplastic resin sheet according to claim 5, wherein the proportion (Xa %) of the component having the molecular weight of 100,000 or less in the integral molecular weight distribution curve of the polymer (a) by gel permeation chromatography (GPC) method is 60 to 96%.

7. The fiber-reinforced thermoplastic resin sheet according to claim 1, wherein a proportion (Ya %) of a component having a molecular weight of 10,000 or less in the integral molecular weight distribution curve of the polymer (a) by gel permeation chromatography (GPC) method is 20 to 40%.

8. The fiber-reinforced thermoplastic resin sheet according to claim 1, wherein an average content number of the spread reinforcement fibers in a thickness direction of the tape-shaped unidirectional prepreg is 20 or less.

9. The fiber-reinforced thermoplastic resin sheet according to claim 1, wherein an average content density of the spread reinforcement fibers in a width direction of the tape-shaped unidirectional prepreg is 150 to 2000 fibers/mm when being calculated by Formula (3):

average content density [fibers/mm] of reinforcement fibers in width direction=(average content number [fibers] of reinforcement fibers in thickness direction)×(1/single yarn diameter [mm] of reinforcement fibers).

10. The fiber-reinforced thermoplastic resin sheet according to claim 1, wherein a length in a fiber direction of the tape-shaped unidirectional prepreg is 10 to 50 mm.

11. The fiber-reinforced thermoplastic resin sheet according to claim 1, wherein the spread reinforcement fibers are carbon fibers.

12. The fiber-reinforced thermoplastic resin sheet according to claim 1, wherein a number of layers of the tape-shaped unidirectional prepreg per unit thickness of the fiber-reinforced thermoplastic resin sheet is 6 to 40 layers/mm.

13. The fiber-reinforced thermoplastic resin sheet according to claim 1, wherein $M_{wa}$ is 26,000 to 140,000 and a proportion $(M_{wb}/M_{wa})$ of $M_{wb}$ to $M_{wa}$ is 1.05 to 1.8.

14. A molded body of the fiber-reinforced thermoplastic resin sheet according to claim 1.

15. The fiber-reinforced thermoplastic resin sheet according to claim 1, wherein the proportion $(M_{wb}/M_{wa})$ of $M_{wb}$ to $M_{wa}$ is 1.09 to 1.8.

16. The fiber-reinforced thermoplastic resin sheet according to claim 1, wherein the proportion $(M_{wb}/M_{wa})$ of $M_{wb}$ to $M_{wa}$ is 1.09 to 1.50.

17. A manufacturing method of the fiber-reinforced thermoplastic resin sheet according to claim 1, at least comprising:

(a) a step of spreading the reinforcement fibers;

(b) a step of impregnating the spread reinforcement fibers with the bisphenol A type epoxy compound represented by Formula (1):

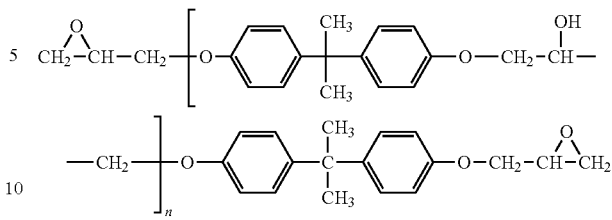

(1)

where n is an integer of 1 to 4,
the bisphenol compound selected from the group consisting of bisphenol A, bisphenol F, bisphenol S, bisphenol B, bisphenol E, and bisphenol P;

(c) a step of heating the spread reinforcement fibers impregnated with the bisphenol A type epoxy compound and the bisphenol compound to polymerize the bisphenol A type epoxy compound and the bisphenol compound impregnated in the spread reinforcement fibers until a weight average molecular weight of an acquired polymer becomes 5,000 to 25,000 to acquire the tape-shaped unidirectional prepreg;

(d) a step of randomly laminating the tape-shaped unidirectional prepreg to acquire a laminate; and (e) a step of heating the laminate at a temperature of 100° C. to 200° C. to acquire the fiber-reinforced thermoplastic resin sheet.

18. The manufacturing method according to claim 17, wherein at least one compound having one reactive group in one molecule is additionally impregnated in step (b), wherein the reactive group is a hydroxyl group or an epoxy group.

19. The manufacturing method according to claim 18, wherein the at least one compound having one reactive group in one molecule is impregnated in an amount to be at 0.1 to 8 mass % with respect to a total amount of the bisphenol A type epoxy compound represented by Formula (1) and the bisphenol compound in step (b).

20. The manufacturing method according to claim 18, wherein the at least one compound having one reactive group in one molecule is a monofunctional epoxy compound.

* * * * *